United States Patent
Natarajan et al.

(10) Patent No.: US 11,343,237 B1
(45) Date of Patent: May 24, 2022

(54) METHODS FOR MANAGING A FEDERATED IDENTITY ENVIRONMENT USING SECURITY AND ACCESS CONTROL DATA AND DEVICES THEREOF

(71) Applicant: F5 Networks, Inc., Seattle, WA (US)

(72) Inventors: Ravi Natarajan, Fremont, CA (US);
Wui Chung Lie, San Jose, CA (US);
Bipin Kumar, San Ramon, CA (US);
Gauravsingh Khatri, Campbell, CA (US); Deepali Shah, San Jose, CA (US)

(73) Assignee: F5, Inc., Seattle, WA (US)

( * ) Notice: Subject to any disclaimer, the term of this patent is extended or adjusted under 35 U.S.C. 154(b) by 148 days.

(21) Appl. No.: 15/941,498

(22) Filed: Mar. 30, 2018

Related U.S. Application Data

(60) Provisional application No. 62/505,435, filed on May 12, 2017.

(51) Int. Cl.
*H04L 29/06* (2006.01)
*H04L 9/40* (2022.01)

(52) U.S. Cl.
CPC ...... *H04L 63/0815* (2013.01); *H04L 63/0884* (2013.01); *H04L 63/102* (2013.01)

(58) Field of Classification Search
CPC . H04L 63/08; H04L 63/0815; H04L 63/0884; H04L 63/0876; H04L 63/10; H04L 63/101; H04L 63/102
See application file for complete search history.

(56) References Cited

U.S. PATENT DOCUMENTS

| | | |
|---|---|---|
| 3,950,735 A | 4/1976 | Patel |
| 4,644,532 A | 2/1987 | George et al. |

(Continued)

FOREIGN PATENT DOCUMENTS

| | | |
|---|---|---|
| CA | 2080530 A1 | 4/1994 |
| EP | 744850 A2 | 11/1996 |

(Continued)

OTHER PUBLICATIONS

F5 Networks, "BIG-IP® Access Policy Manager®: Implementations", May 9, 2016, 168 pages, V12.1, F5 Networks, Inc.

(Continued)

*Primary Examiner* — Shaqueal D Wade-Wright
(74) *Attorney, Agent, or Firm* — Troutman Pepper Hamilton Sanders LLP (Rochester)

(57) ABSTRACT

Methods, non-transitory computer readable media, network traffic manager apparatuses, and systems that assist with managing a federated identity environment includes performing one or more first access control checks on a client upon receiving a request to access one or more web applications. A new signature including data associated with the performed one or more access control checks is generated. Next, the client is redirected to a first server with the generated signature to determine when to authorize the client to access the requested one or more web applications. The client is granted access to the requested one or more web applications when the client is determined to be authorized to access the requested one or more web applications based on one or more second access control checks enforced on the client using the generated signature, and wherein data associated with the enforced one or more second access control checks is included in a response signature.

16 Claims, 4 Drawing Sheets

(56) References Cited

U.S. PATENT DOCUMENTS

| | | |
|---|---|---|
| 4,897,781 A | 1/1990 | Chang et al. |
| 4,965,772 A | 10/1990 | Daniel et al. |
| 5,023,826 A | 6/1991 | Patel |
| 5,053,953 A | 10/1991 | Patel |
| 5,167,024 A | 11/1992 | Smith et al. |
| 5,282,201 A | 1/1994 | Frank et al. |
| 5,299,312 A | 3/1994 | Rocco |
| 5,327,529 A | 7/1994 | Fults et al. |
| 5,367,635 A | 11/1994 | Bauer et al. |
| 5,371,852 A | 12/1994 | Attanasio et al. |
| 5,406,502 A | 4/1995 | Haramaty et al. |
| 5,475,857 A | 12/1995 | Dally |
| 5,517,617 A | 5/1996 | Sathaye et al. |
| 5,519,694 A | 5/1996 | Brewer et al. |
| 5,519,778 A | 5/1996 | Leighton et al. |
| 5,521,591 A | 5/1996 | Arora et al. |
| 5,528,701 A | 6/1996 | Aref |
| 5,550,816 A | 8/1996 | Hardwick et al. |
| 5,581,764 A | 12/1996 | Fitzgerald et al. |
| 5,596,742 A | 1/1997 | Agarwal et al. |
| 5,606,665 A | 2/1997 | Fang et al. |
| 5,611,049 A | 3/1997 | Pitts |
| 5,623,490 A | 4/1997 | Richter et al. |
| 5,663,018 A | 9/1997 | Cummings et al. |
| 5,752,023 A | 5/1998 | Nazli et al. |
| 5,761,484 A | 6/1998 | Agarwal et al. |
| 5,768,423 A | 6/1998 | Aref et al. |
| 5,774,660 A | 6/1998 | Brendel et al. |
| 5,790,554 A | 8/1998 | Pitcher et al. |
| 5,802,052 A | 9/1998 | Venkataraman |
| 5,812,550 A | 9/1998 | Sohn et al. |
| 5,825,772 A | 10/1998 | Dobbins et al. |
| 5,828,847 A | 10/1998 | Gehr et al. |
| 5,832,283 A | 11/1998 | Chou et al. |
| 5,875,296 A | 2/1999 | Shi et al. |
| 5,892,914 A | 4/1999 | Pitts |
| 5,892,932 A | 4/1999 | Kim |
| 5,919,247 A | 7/1999 | Van Hoff et al. |
| 5,936,939 A | 8/1999 | Des Jardins et al. |
| 5,941,988 A | 8/1999 | Bhagwat et al. |
| 5,946,388 A | 8/1999 | Walker et al. |
| 5,946,690 A | 8/1999 | Pitts |
| 5,949,885 A | 9/1999 | Leighton |
| 5,951,694 A | 9/1999 | Choquier et al. |
| 5,959,990 A | 9/1999 | Frantz et al. |
| 5,974,460 A | 10/1999 | Maddalozzo, Jr. et al. |
| 5,983,281 A | 11/1999 | Ogle et al. |
| 5,987,523 A | 11/1999 | Hind et al. |
| 5,988,847 A | 11/1999 | Mclaughlin et al. |
| 5,991,302 A | 11/1999 | Berl et al. |
| 5,995,491 A | 11/1999 | Richter et al. |
| 6,006,260 A | 12/1999 | Barrick, Jr. et al. |
| 6,006,264 A | 12/1999 | Colby et al. |
| 6,026,452 A | 2/2000 | Pitts |
| 6,026,500 A | 2/2000 | Topff et al. |
| 6,028,857 A | 2/2000 | Poor |
| 6,029,175 A | 2/2000 | Chow et al. |
| 6,041,365 A | 3/2000 | Kleinerman |
| 6,047,356 A | 4/2000 | Anderson et al. |
| 6,051,169 A | 4/2000 | Brown et al. |
| 6,064,671 A | 5/2000 | Killian |
| 6,067,558 A | 5/2000 | Wendt et al. |
| 6,078,956 A | 6/2000 | Bryant et al. |
| 6,085,234 A | 7/2000 | Pitts et al. |
| 6,092,196 A | 7/2000 | Reiche |
| 6,104,706 A | 8/2000 | Richter et al. |
| 6,108,703 A | 8/2000 | Leighton et al. |
| 6,111,876 A | 8/2000 | Frantz et al. |
| 6,128,279 A | 10/2000 | O'Neil et al. |
| 6,128,657 A | 10/2000 | Okanoya et al. |
| 6,154,777 A | 11/2000 | Ebrahim |
| 6,157,950 A | 12/2000 | Krishnan |
| 6,160,874 A | 12/2000 | Dickerman et al. |
| 6,170,022 B1 | 1/2001 | Linville et al. |
| 6,178,423 B1 | 1/2001 | Douceur et al. |
| 6,182,139 B1 | 1/2001 | Brendel |
| 6,185,619 B1 | 2/2001 | Joffe et al. |
| 6,192,051 B1 | 2/2001 | Lipman et al. |
| 6,233,612 B1 | 5/2001 | Fruchtman et al. |
| 6,246,684 B1 | 6/2001 | Chapman et al. |
| 6,253,226 B1 | 6/2001 | Chidambaran et al. |
| 6,253,230 B1 | 6/2001 | Couland et al. |
| 6,259,405 B1 | 7/2001 | Stewart et al. |
| 6,260,070 B1 | 7/2001 | Shah |
| 6,263,368 B1 | 7/2001 | Martin |
| 6,279,111 B1 | 8/2001 | Jensenworth et al. |
| 6,289,012 B1 | 9/2001 | Harrington et al. |
| 6,292,832 B1 | 9/2001 | Shah et al. |
| 6,298,380 B1 | 10/2001 | Coile et al. |
| 6,304,913 B1 | 10/2001 | Rune |
| 6,308,273 B1 | 10/2001 | Goertzel et al. |
| 6,327,622 B1 | 12/2001 | Jindal et al. |
| 6,330,574 B1 | 12/2001 | Murashita |
| 6,338,082 B1 | 1/2002 | Schneider |
| 6,343,324 B1 | 1/2002 | Hubis et al. |
| 6,347,339 B1 | 2/2002 | Morris et al. |
| 6,353,848 B1 | 3/2002 | Morris |
| 6,356,541 B1 | 3/2002 | Miler et al. |
| 6,360,270 B1 | 3/2002 | Cherkasova et al. |
| 6,363,056 B1 | 3/2002 | Beigi et al. |
| 6,370,527 B1 | 4/2002 | Singhal |
| 6,374,300 B2 | 4/2002 | Masters |
| 6,377,577 B1 | 4/2002 | Bechtolsheim et al. |
| 6,389,462 B1 | 5/2002 | Cohen et al. |
| 6,396,833 B1 | 5/2002 | Zhang et al. |
| 6,411,986 B1 | 6/2002 | Susai et al. |
| 6,430,562 B1 | 8/2002 | Kardos et al. |
| 6,434,081 B1 | 8/2002 | Johnson et al. |
| 6,446,108 B1 | 9/2002 | Rosenberg et al. |
| 6,466,580 B1 | 10/2002 | Leung |
| 6,469,983 B2 | 10/2002 | Narayana et al. |
| 6,480,476 B1 | 11/2002 | Willars |
| 6,484,261 B1 | 11/2002 | Wiegel |
| 6,490,624 B1 | 12/2002 | Sampson et al. |
| 6,510,135 B1 | 1/2003 | Almulhem et al. |
| 6,510,458 B1 | 1/2003 | Berstis et al. |
| 6,513,061 B1 | 1/2003 | Ebata et al. |
| 6,514,085 B2 | 2/2003 | Slattery et al. |
| 6,519,643 B1 | 2/2003 | Foulkes et al. |
| 6,542,936 B1 | 4/2003 | Mayle et al. |
| 6,560,230 B1 | 5/2003 | Li et al. |
| 6,578,069 B1 | 6/2003 | Hopmann et al. |
| 6,601,084 B1 | 7/2003 | Bhaskaran et al. |
| 6,606,744 B1 | 8/2003 | Mikurak |
| 6,615,267 B1 | 9/2003 | Whalen et al. |
| 6,631,422 B1 | 10/2003 | Althaus et al. |
| 6,636,502 B1 | 10/2003 | Lager et al. |
| 6,636,894 B1 | 10/2003 | Short et al. |
| 6,650,640 B1 | 11/2003 | Muller et al. |
| 6,650,641 B1 | 11/2003 | Albert et al. |
| 6,654,346 B1 | 11/2003 | Mahalingaiah et al. |
| 6,654,701 B2 | 11/2003 | Hatley |
| 6,661,802 B1 | 12/2003 | Homberg et al. |
| 6,671,818 B1 | 12/2003 | Mikurak |
| 6,683,873 B1 | 1/2004 | Kwok et al. |
| 6,691,165 B1 | 2/2004 | Bruck et al. |
| 6,694,517 B1 | 2/2004 | James et al. |
| 6,701,415 B1 | 3/2004 | Hendren |
| 6,708,187 B1 | 3/2004 | Shanumgam et al. |
| 6,708,220 B1 | 3/2004 | Olin |
| 6,718,380 B1 | 4/2004 | Mohaban et al. |
| 6,728,704 B2 | 4/2004 | Mao et al. |
| 6,738,357 B1 | 5/2004 | Richter et al. |
| 6,742,045 B1 | 5/2004 | Albert et al. |
| 6,744,776 B1 | 6/2004 | Kalkunte et al. |
| 6,748,416 B2 | 6/2004 | Carpenter et al. |
| 6,751,663 B1 | 6/2004 | Farrell et al. |
| 6,754,215 B1 | 6/2004 | Arikawa et al. |
| 6,754,228 B1 | 6/2004 | Ludwig |
| 6,754,699 B2 | 6/2004 | Swildens et al. |
| 6,760,337 B1 | 7/2004 | Snyder et al. |
| 6,760,775 B1 | 7/2004 | Anerousis et al. |
| 6,772,219 B1 | 8/2004 | Shobatake |
| 6,779,039 B1 | 8/2004 | Bommareddy et al. |

(56) References Cited

U.S. PATENT DOCUMENTS

| | | |
|---|---|---|
| 6,781,986 B1 | 8/2004 | Sabaa et al. |
| 6,789,203 B1 | 9/2004 | Belissent |
| 6,795,860 B1 | 9/2004 | Shah |
| 6,798,777 B1 | 9/2004 | Ferguson et al. |
| 6,804,542 B1 | 10/2004 | Haartsen |
| 6,816,901 B1 | 11/2004 | Sitaraman et al. |
| 6,816,977 B2 | 11/2004 | Brakmo et al. |
| 6,826,698 B1 | 11/2004 | Minkin et al. |
| 6,829,238 B2 | 12/2004 | Tokuyo et al. |
| 6,857,009 B1 | 2/2005 | Ferreria et al. |
| 6,862,282 B1 | 3/2005 | Oden |
| 6,865,593 B1 | 3/2005 | Reshef et al. |
| 6,868,082 B1 | 3/2005 | Allen, Jr. et al. |
| 6,868,447 B1 | 3/2005 | Slaughter et al. |
| 6,871,221 B1 | 3/2005 | Styles |
| 6,876,629 B2 | 4/2005 | Beshai et al. |
| 6,876,654 B1 | 4/2005 | Hegde |
| 6,880,017 B1 | 4/2005 | Maree et al. |
| 6,883,137 B1 | 4/2005 | Girardot et al. |
| 6,888,836 B1 | 5/2005 | Cherkasova |
| 6,892,309 B2 | 5/2005 | Richmond et al. |
| 6,904,040 B2 | 6/2005 | Salapura et al. |
| 6,914,881 B1 | 7/2005 | Mansfield et al. |
| 6,928,082 B2 | 8/2005 | Liu et al. |
| 6,928,518 B2 | 8/2005 | Talagala |
| 6,947,985 B2 | 9/2005 | Hegli et al. |
| 6,950,434 B1 | 9/2005 | Viswanath et al. |
| 6,954,780 B2 | 10/2005 | Susai et al. |
| 6,957,272 B2 | 10/2005 | Tallegas et al. |
| 6,959,394 B1 | 10/2005 | Brickell et al. |
| 6,970,475 B1 | 11/2005 | Fraser et al. |
| 6,970,924 B1 | 11/2005 | Chu et al. |
| 6,973,490 B1 | 12/2005 | Robertson et al. |
| 6,975,592 B1 | 12/2005 | Seddigh et al. |
| 6,986,040 B1 | 1/2006 | Kramer et al. |
| 6,987,763 B2 | 1/2006 | Rochberger et al. |
| 6,990,074 B2 | 1/2006 | Wan et al. |
| 6,990,114 B1 | 1/2006 | Erimli et al. |
| 7,003,564 B2 | 2/2006 | Greuel et al. |
| 7,006,453 B1 | 2/2006 | Ahmed et al. |
| 7,006,502 B2 | 2/2006 | Lin |
| 7,007,092 B2 | 2/2006 | Peiffer |
| 7,020,713 B1 | 3/2006 | Shah et al. |
| 7,023,974 B1 | 4/2006 | Brannam et al. |
| 7,023,979 B1 | 4/2006 | Wu et al. |
| 7,035,212 B1 | 4/2006 | Mittal et al. |
| 7,039,061 B2 | 5/2006 | Connor et al. |
| 7,058,633 B1 | 6/2006 | Gnagy et al. |
| 7,065,203 B1 | 6/2006 | Huart et al. |
| 7,065,482 B2 | 6/2006 | Shorey et al. |
| 7,075,924 B2 | 7/2006 | Richter et al. |
| 7,076,689 B2 | 7/2006 | Atkinson |
| 7,080,314 B1 | 7/2006 | Garofalakis et al. |
| 7,089,491 B2 | 8/2006 | Feinberg et al. |
| 7,099,277 B2 | 8/2006 | Sahinoglu et al. |
| 7,113,993 B1 | 9/2006 | Cappiello et al. |
| 7,113,996 B2 | 9/2006 | Kronenberg |
| 7,133,863 B2 | 11/2006 | Teng et al. |
| 7,133,944 B2 | 11/2006 | Song et al. |
| 7,139,792 B1 | 11/2006 | Mishra et al. |
| 7,161,904 B2 | 1/2007 | Hussain et al. |
| 7,185,359 B2 | 2/2007 | Schmidt et al. |
| 7,191,163 B2 | 3/2007 | Herrera et al. |
| 7,308,709 B1 | 5/2007 | Brezak, Jr. et al. |
| 7,228,359 B1 | 6/2007 | Monteiro |
| 7,228,422 B2 | 6/2007 | Morioka et al. |
| 7,236,491 B2 | 6/2007 | Tsao et al. |
| 7,240,100 B1 | 7/2007 | Wein et al. |
| 7,257,633 B2 | 8/2007 | Masputra et al. |
| 7,287,082 B1 | 10/2007 | O'Toole, Jr. |
| 7,292,541 B1 | 11/2007 | Cs |
| 7,295,827 B2 | 11/2007 | Liu et al. |
| 7,296,263 B1 | 11/2007 | Jacob |
| 7,308,475 B1 | 12/2007 | Pruitt et al. |
| 7,308,703 B2 | 12/2007 | Wright et al. |
| 7,310,339 B1 | 12/2007 | Powers et al. |
| 7,319,696 B2 | 1/2008 | Inoue et al. |
| 7,321,926 B1 | 1/2008 | Zhang et al. |
| 7,324,533 B1 | 1/2008 | Deliberate et al. |
| 7,333,999 B1 | 2/2008 | Njemanze |
| 7,340,571 B2 | 3/2008 | Saze |
| 7,343,413 B2 | 3/2008 | Gilde et al. |
| 7,349,391 B2 | 3/2008 | Ben-Dor et al. |
| 7,373,438 B1 | 5/2008 | Debergalis et al. |
| 7,383,570 B2 | 6/2008 | Pinkas et al. |
| 7,398,552 B2 | 7/2008 | Pardee et al. |
| 7,409,440 B1 | 8/2008 | Jacob |
| 7,433,962 B2 | 10/2008 | Janssen et al. |
| 7,437,478 B2 | 10/2008 | Yokota et al. |
| 7,453,844 B1 | 11/2008 | Lee et al. |
| 7,454,480 B2 | 11/2008 | Labio et al. |
| 7,490,162 B1 | 2/2009 | Masters |
| 7,500,243 B2 | 3/2009 | Huetsch et al. |
| 7,500,269 B2 | 3/2009 | Huotar et al. |
| 7,505,795 B1 | 3/2009 | Lim et al. |
| 7,516,492 B1 | 4/2009 | Nisbet et al. |
| 7,522,581 B2 | 4/2009 | Acharya et al. |
| 7,526,541 B2 | 4/2009 | Roese et al. |
| 7,555,608 B2 | 6/2009 | Niak et al. |
| 7,558,197 B1 | 7/2009 | Sindhu et al. |
| 7,577,723 B2 | 8/2009 | Matsuda et al. |
| 7,580,971 B1 | 8/2009 | Gollapudi et al. |
| 7,590,732 B2 | 9/2009 | Rune |
| 7,607,164 B2 | 10/2009 | Vasishth et al. |
| 7,624,422 B2 | 11/2009 | Williams et al. |
| 7,624,424 B2 | 11/2009 | Morita et al. |
| 7,627,891 B2 | 12/2009 | Williams et al. |
| 7,640,347 B1 | 12/2009 | Sloat et al. |
| 7,644,137 B2 | 1/2010 | Bozak et al. |
| 7,668,166 B1 | 2/2010 | Rekhter et al. |
| 7,680,915 B2 | 3/2010 | Still et al. |
| 7,684,423 B2 | 3/2010 | Tripathi et al. |
| 7,689,710 B2 | 3/2010 | Tang et al. |
| 7,698,458 B1 | 4/2010 | Liu et al. |
| 7,716,077 B1 | 5/2010 | Mikurak |
| 7,725,093 B2 | 5/2010 | Sengupta et al. |
| 7,725,657 B2 | 5/2010 | Hasenplaugh et al. |
| 7,778,187 B2 | 8/2010 | Chaturvedi et al. |
| 7,801,978 B1 | 9/2010 | Susai et al. |
| 7,808,913 B2 | 10/2010 | Ansari et al. |
| 7,809,667 B1 | 10/2010 | Yehuda et al. |
| 7,822,839 B1 | 10/2010 | Pruitt et al. |
| 7,831,662 B2 | 11/2010 | Clark et al. |
| 7,861,085 B1 | 12/2010 | Case et al. |
| 7,895,653 B2 | 2/2011 | Calo et al. |
| 7,903,554 B1 | 3/2011 | Manur et al. |
| 7,908,245 B2 | 3/2011 | Nakano et al. |
| 7,908,314 B2 | 3/2011 | Yamaguchi et al. |
| 7,925,908 B2 | 4/2011 | Kim |
| 7,930,365 B2 | 4/2011 | Dixit et al. |
| 7,933,946 B2 | 4/2011 | Livshits et al. |
| 7,945,908 B1 | 5/2011 | Waldspurger et al. |
| 7,957,991 B2 | 6/2011 | Mikurak |
| 7,958,222 B1 | 6/2011 | Pruitt et al. |
| 7,984,141 B2 | 7/2011 | Gupta et al. |
| 7,984,500 B1 | 7/2011 | Khanna et al. |
| 8,024,443 B1 | 9/2011 | Jacob |
| 8,032,409 B1 | 10/2011 | Mikurak |
| 8,037,528 B2 | 10/2011 | Williams et al. |
| 8,041,022 B1 | 10/2011 | Andreasen et al. |
| 8,064,342 B2 | 11/2011 | Badger |
| 8,069,225 B2 | 11/2011 | Mccanne et al. |
| 8,069,483 B1 | 11/2011 | Matlock |
| 8,103,781 B1 | 1/2012 | Wu et al. |
| 8,130,650 B2 | 3/2012 | Allen, Jr. et al. |
| 8,149,819 B2 | 4/2012 | Kobayashi et al. |
| 8,155,128 B2 | 4/2012 | Balyan et al. |
| 8,170,055 B2 | 5/2012 | Fang et al. |
| 8,171,124 B2 | 5/2012 | Kondamuru |
| 8,189,567 B2 | 5/2012 | Kavanagh et al. |
| 8,190,769 B1 | 5/2012 | Shukla et al. |
| 8,199,757 B2 | 6/2012 | Pani et al. |
| 8,205,246 B2 | 6/2012 | Shalzkamer et al. |
| 8,218,572 B2 | 7/2012 | Moran et al. |

(56) References Cited

U.S. PATENT DOCUMENTS

| | | |
|---|---|---|
| 8,239,954 B2 | 8/2012 | Wobber et al. |
| 8,271,620 B2 | 9/2012 | Witchey |
| 8,274,895 B2 | 9/2012 | Rahman et al. |
| 8,321,908 B2 | 11/2012 | Gai et al. |
| 8,340,110 B2 | 12/2012 | Gast |
| 8,351,333 B2 | 1/2013 | Rao et al. |
| 8,380,854 B2 | 2/2013 | Szabo |
| 8,396,836 B1 | 3/2013 | Ferguson et al. |
| 8,417,817 B1 | 4/2013 | Jacobs |
| 8,447,871 B1 | 5/2013 | Szabo |
| 8,447,970 B2 | 5/2013 | Klein et al. |
| 8,452,876 B1 | 5/2013 | Williams et al. |
| 8,463,850 B1 | 6/2013 | Mccann |
| 8,464,265 B2 | 6/2013 | Worley |
| 8,468,247 B1 | 6/2013 | Richardson et al. |
| 8,468,267 B2 | 6/2013 | Mgang et al. |
| 8,499,331 B1 | 7/2013 | Yehuda et al. |
| 8,521,851 B1 | 8/2013 | Richardson et al. |
| 8,521,880 B1 | 8/2013 | Richardson et al. |
| 8,522,306 B2 | 8/2013 | Lerner et al. |
| 8,539,224 B2 | 9/2013 | Henderson et al. |
| 8,560,693 B1 | 10/2013 | Wang et al. |
| 8,566,474 B2 | 10/2013 | Kanode et al. |
| 8,578,050 B2 | 11/2013 | Craig et al. |
| 8,601,000 B1 | 12/2013 | Stefani et al. |
| 8,606,921 B2 | 12/2013 | Vasquez et al. |
| 8,615,022 B2 | 12/2013 | Harrison et al. |
| 8,646,067 B2 | 2/2014 | Agarwal et al. |
| 8,665,969 B2 | 3/2014 | Kranawetter et al. |
| 8,701,179 B1 | 4/2014 | Penno et al. |
| 8,725,836 B2 | 5/2014 | Lowery et al. |
| 8,726,338 B2 | 5/2014 | Narayanaswamy et al. |
| 8,737,304 B2 | 5/2014 | Karuturi et al. |
| 8,778,665 B2 | 7/2014 | Gibbons et al. |
| 8,804,504 B1 | 8/2014 | Chen |
| 8,819,109 B1 | 8/2014 | Krishnamurthy et al. |
| 8,819,419 B2 | 8/2014 | Carlson et al. |
| 8,830,874 B2 | 9/2014 | Cho et al. |
| 8,838,817 B1 | 9/2014 | Biswas |
| 8,873,753 B2 | 10/2014 | Parker |
| 8,875,274 B2 | 10/2014 | Montemurro et al. |
| 8,879,431 B2 | 11/2014 | Ridel et al. |
| 8,886,981 B1 | 11/2014 | Baumann et al. |
| 8,908,545 B1 | 12/2014 | Chen et al. |
| 8,954,080 B2 | 2/2015 | Janakiraman et al. |
| 8,958,306 B2 | 2/2015 | McCann et al. |
| 8,959,215 B2 | 2/2015 | Koponen et al. |
| 9,036,529 B2 | 5/2015 | Erickson et al. |
| 9,037,166 B2 | 5/2015 | De Wit et al. |
| 9,042,914 B2 | 5/2015 | Harvey et al. |
| 9,047,259 B1 | 6/2015 | Ho et al. |
| 9,049,172 B2 | 6/2015 | Dargis |
| 9,059,985 B1 | 6/2015 | Treleaven et al. |
| 9,077,554 B1 | 7/2015 | Szabo |
| 9,083,760 B1 | 7/2015 | Hughes et al. |
| 9,143,379 B1 | 9/2015 | Berger et al. |
| 9,143,451 B2 | 9/2015 | Amdahl et al. |
| 9,231,886 B2 | 1/2016 | Jackson |
| 9,246,941 B1 | 1/2016 | Gibson et al. |
| 9,338,176 B2 | 5/2016 | Trumbull et al. |
| 9,349,015 B1 | 5/2016 | Archer et al. |
| 9,351,193 B2 | 5/2016 | Raleigh et al. |
| 9,363,675 B2 | 6/2016 | Chuang et al. |
| 9,578,126 B1 | 2/2017 | Kirti et al. |
| 9,721,112 B2 | 8/2017 | Tse et al. |
| 10,015,197 B2 | 7/2018 | Bai et al. |
| 10,142,308 B1 | 11/2018 | Duchin et al. |
| 10,146,933 B1 | 12/2018 | Schoenbrun et al. |
| 11,038,869 B1 * | 6/2021 | Natarajan ............ H04L 63/0807 |
| 2001/0007560 A1 | 7/2001 | Masuda et al. |
| 2001/0009554 A1 | 7/2001 | Katseff et al. |
| 2001/0023442 A1 | 9/2001 | Masters |
| 2001/0053694 A1 | 12/2001 | Igarashi et al. |
| 2002/0002502 A1 | 1/2002 | Maes et al. |
| 2002/0010757 A1 | 1/2002 | Granik et al. |
| 2002/0010783 A1 | 1/2002 | Primak et al. |
| 2002/0012352 A1 | 1/2002 | Hansson et al. |
| 2002/0032777 A1 | 3/2002 | Kawata et al. |
| 2002/0038360 A1 | 3/2002 | Andrews et al. |
| 2002/0046291 A1 | 4/2002 | O'Callaghan et al. |
| 2002/0049842 A1 | 4/2002 | Huetsch et al. |
| 2002/0065848 A1 | 5/2002 | Walker et al. |
| 2002/0072048 A1 | 6/2002 | Slattery et al. |
| 2002/0080752 A1 | 6/2002 | Johansson et al. |
| 2002/0083067 A1 | 6/2002 | Tamayo et al. |
| 2002/0087571 A1 | 7/2002 | Stapel et al. |
| 2002/0087744 A1 | 7/2002 | Kitchin |
| 2002/0095498 A1 | 7/2002 | Chanda et al. |
| 2002/0099829 A1 | 7/2002 | Richards et al. |
| 2002/0099842 A1 | 7/2002 | Jennings et al. |
| 2002/0103823 A1 | 8/2002 | Jackson et al. |
| 2002/0112061 A1 | 8/2002 | Shih et al. |
| 2002/0138615 A1 | 9/2002 | Schmeling |
| 2002/0143819 A1 | 10/2002 | Han et al. |
| 2002/0143852 A1 | 10/2002 | Guo et al. |
| 2002/0161913 A1 | 10/2002 | Gonzalez et al. |
| 2002/0162118 A1 | 10/2002 | Levy et al. |
| 2002/0174216 A1 | 11/2002 | Shorey et al. |
| 2002/0194112 A1 | 12/2002 | Depinto et al. |
| 2002/0194342 A1 | 12/2002 | Lu et al. |
| 2002/0198956 A1 | 12/2002 | Dunshea et al. |
| 2002/0198993 A1 | 12/2002 | Cudd et al. |
| 2003/0005172 A1 | 1/2003 | Chessell |
| 2003/0009528 A1 | 1/2003 | Sharif et al. |
| 2003/0018450 A1 | 1/2003 | Carley |
| 2003/0018585 A1 | 1/2003 | Butler et al. |
| 2003/0023880 A1 | 1/2003 | Edwards et al. |
| 2003/0034905 A1 | 2/2003 | Anton et al. |
| 2003/0037070 A1 | 2/2003 | Marston |
| 2003/0046291 A1 | 3/2003 | Fascenda |
| 2003/0051045 A1 | 3/2003 | Connor |
| 2003/0055723 A1 | 3/2003 | English |
| 2003/0065653 A1 | 4/2003 | Overton |
| 2003/0065951 A1 | 4/2003 | Igeta et al. |
| 2003/0069918 A1 | 4/2003 | Lu et al. |
| 2003/0069974 A1 | 4/2003 | Lu et al. |
| 2003/0070069 A1 | 4/2003 | Belapurkar et al. |
| 2003/0074301 A1 | 4/2003 | Solomon |
| 2003/0086415 A1 | 5/2003 | Bernhard et al. |
| 2003/0105807 A1 | 6/2003 | Thompson et al. |
| 2003/0105846 A1 | 6/2003 | Zhao et al. |
| 2003/0105983 A1 | 6/2003 | Brakmo et al. |
| 2003/0108000 A1 | 6/2003 | Chaney et al. |
| 2003/0108002 A1 | 6/2003 | Chaney et al. |
| 2003/0108052 A1 | 6/2003 | Inoue et al. |
| 2003/0115267 A1 | 6/2003 | Hinton et al. |
| 2003/0120948 A1 | 6/2003 | Schmidt et al. |
| 2003/0126200 A1 | 7/2003 | Wolff |
| 2003/0128708 A1 | 7/2003 | Inoue et al. |
| 2003/0130945 A1 | 7/2003 | Force et al. |
| 2003/0139934 A1 | 7/2003 | Mandera |
| 2003/0145062 A1 | 7/2003 | Sharma et al. |
| 2003/0145233 A1 | 7/2003 | Poletto et al. |
| 2003/0156586 A1 | 8/2003 | Lee et al. |
| 2003/0163576 A1 | 8/2003 | Janssen et al. |
| 2003/0179755 A1 | 9/2003 | Fraser |
| 2003/0189936 A1 | 10/2003 | Terrell et al. |
| 2003/0191812 A1 | 10/2003 | Agarwalla et al. |
| 2003/0195813 A1 | 10/2003 | Pallister et al. |
| 2003/0195962 A1 | 10/2003 | Kikuchi et al. |
| 2003/0195984 A1 | 10/2003 | Zisapel et al. |
| 2003/0208596 A1 | 11/2003 | Carolan et al. |
| 2003/0212954 A1 | 11/2003 | Patrudu |
| 2003/0220835 A1 | 11/2003 | Bames, Jr. |
| 2003/0225485 A1 | 12/2003 | Fritz et al. |
| 2003/0229665 A1 | 12/2003 | Ryman |
| 2003/0236995 A1 | 12/2003 | Fretwell, Jr. |
| 2004/0003287 A1 | 1/2004 | Zissimopoulos et al. |
| 2004/0006590 A1 | 1/2004 | Lucovsky et al. |
| 2004/0006591 A1 | 1/2004 | Matsui et al. |
| 2004/0015783 A1 | 1/2004 | Lennon et al. |
| 2004/0017825 A1 | 1/2004 | Stanwood et al. |
| 2004/0030627 A1 | 2/2004 | Sedukhin |
| 2004/0030740 A1 | 2/2004 | Stelting |

(56) References Cited

U.S. PATENT DOCUMENTS

| | | |
|---|---|---|
| 2004/0043758 A1 | 3/2004 | Sorvari et al. |
| 2004/0054791 A1 | 3/2004 | Chakraborty et al. |
| 2004/0059789 A1 | 3/2004 | Shum |
| 2004/0064544 A1 | 4/2004 | Barsness et al. |
| 2004/0064554 A1 | 4/2004 | Kuno et al. |
| 2004/0072569 A1 | 4/2004 | Omae et al. |
| 2004/0093361 A1 | 5/2004 | Therrien et al. |
| 2004/0103283 A1 | 5/2004 | Hornak |
| 2004/0111523 A1 | 6/2004 | Hall et al. |
| 2004/0111621 A1 | 6/2004 | Himberger et al. |
| 2004/0117493 A1 | 6/2004 | Bazot et al. |
| 2004/0122926 A1 | 6/2004 | Moore et al. |
| 2004/0123277 A1 | 6/2004 | Schrader et al. |
| 2004/0133605 A1 | 7/2004 | Chang et al. |
| 2004/0141185 A1 | 7/2004 | Hill |
| 2004/0151186 A1 | 8/2004 | Akama |
| 2004/0162058 A1 | 8/2004 | Mottes |
| 2004/0167967 A1 | 8/2004 | Bastian et al. |
| 2004/0177165 A1 | 9/2004 | Masputra et al. |
| 2004/0192312 A1 | 9/2004 | Li et al. |
| 2004/0193912 A1 | 9/2004 | Li et al. |
| 2004/0199762 A1 | 10/2004 | Carlson et al. |
| 2004/0210663 A1 | 10/2004 | Phillips et al. |
| 2004/0213156 A1 | 10/2004 | Smallwood et al. |
| 2004/0215665 A1 | 10/2004 | Edgar et al. |
| 2004/0236826 A1 | 11/2004 | Harville et al. |
| 2004/0255000 A1 | 12/2004 | Simionescu et al. |
| 2004/0264472 A1 | 12/2004 | Oliver et al. |
| 2004/0264481 A1 | 12/2004 | Darling et al. |
| 2004/0267920 A1 | 12/2004 | Hydrie et al. |
| 2004/0267948 A1 | 12/2004 | Oliver et al. |
| 2004/0268358 A1 | 12/2004 | Darling et al. |
| 2005/0004887 A1 | 1/2005 | Igakura et al. |
| 2005/0008017 A1 | 1/2005 | Datta et al. |
| 2005/0021703 A1 | 1/2005 | Cherry et al. |
| 2005/0021736 A1 | 1/2005 | Carusi et al. |
| 2005/0027841 A1 | 2/2005 | Rolfe |
| 2005/0027869 A1 | 2/2005 | Johnson |
| 2005/0044158 A1 | 2/2005 | Malik |
| 2005/0044213 A1 | 2/2005 | Kobayashi et al. |
| 2005/0052440 A1 | 3/2005 | Kim et al. |
| 2005/0055435 A1 | 3/2005 | Gbadegesin et al. |
| 2005/0071283 A1 | 3/2005 | Randle et al. |
| 2005/0078604 A1 | 4/2005 | Yim |
| 2005/0117589 A1 | 6/2005 | Douady et al. |
| 2005/0122942 A1 | 6/2005 | Rhee et al. |
| 2005/0122977 A1 | 6/2005 | Lieberman |
| 2005/0138371 A1 | 6/2005 | Supramaniam et al. |
| 2005/0154837 A1 | 7/2005 | Keohane et al. |
| 2005/0165656 A1 | 7/2005 | Frederick et al. |
| 2005/0174944 A1 | 8/2005 | Legault et al. |
| 2005/0175013 A1 | 8/2005 | Le Pennec et al. |
| 2005/0187866 A1 | 8/2005 | Lee |
| 2005/0188211 A1 | 8/2005 | Scott et al. |
| 2005/0188220 A1 | 8/2005 | Nilsson et al. |
| 2005/0198234 A1 | 9/2005 | Leib et al. |
| 2005/0198310 A1 | 9/2005 | Kim et al. |
| 2005/0204162 A1 | 9/2005 | Rayes et al. |
| 2005/0213587 A1 | 9/2005 | Cho et al. |
| 2005/0234928 A1 | 10/2005 | Shkvarchuk et al. |
| 2005/0240664 A1 | 10/2005 | Chen et al. |
| 2005/0256806 A1 | 11/2005 | Tien et al. |
| 2005/0259631 A1 | 11/2005 | Rajahalme |
| 2005/0262238 A1 | 11/2005 | Reeves et al. |
| 2005/0273456 A1 | 12/2005 | Revanuru et al. |
| 2005/0273841 A1 | 12/2005 | Freund |
| 2005/0288939 A1 | 12/2005 | Peled et al. |
| 2006/0031374 A1 | 2/2006 | Lu et al. |
| 2006/0031384 A1 | 2/2006 | Manders et al. |
| 2006/0031520 A1 | 2/2006 | Bedekar et al. |
| 2006/0031778 A1 | 2/2006 | Goodwin et al. |
| 2006/0036764 A1 | 2/2006 | Yokota et al. |
| 2006/0045089 A1 | 3/2006 | Bacher et al. |
| 2006/0045096 A1 | 3/2006 | Farmer et al. |
| 2006/0047785 A1 | 3/2006 | Wang et al. |
| 2006/0059267 A1 | 3/2006 | Cugi et al. |
| 2006/0075462 A1 | 4/2006 | Golan et al. |
| 2006/0077902 A1 | 4/2006 | Kannan et al. |
| 2006/0077986 A1 | 4/2006 | Rune |
| 2006/0083205 A1 | 4/2006 | Buddhikot et al. |
| 2006/0095573 A1 | 5/2006 | Carle et al. |
| 2006/0100752 A1 | 5/2006 | Kim et al. |
| 2006/0106802 A1 | 5/2006 | Giblin et al. |
| 2006/0111113 A1 | 5/2006 | Waris |
| 2006/0112176 A1 | 5/2006 | Liu et al. |
| 2006/0112272 A1 | 5/2006 | Morioka et al. |
| 2006/0112367 A1 | 5/2006 | Harris |
| 2006/0123210 A1 | 6/2006 | Pritchett et al. |
| 2006/0129684 A1 | 6/2006 | Datta |
| 2006/0130133 A1 | 6/2006 | Andreev et al. |
| 2006/0133374 A1 | 6/2006 | Sekiguchi |
| 2006/0135198 A1 | 6/2006 | Lee |
| 2006/0136519 A1 | 6/2006 | Batta et al. |
| 2006/0140193 A1 | 6/2006 | Kakani et al. |
| 2006/0153201 A1 | 7/2006 | Hepper et al. |
| 2006/0156416 A1 | 7/2006 | Huotar et al. |
| 2006/0161577 A1 | 7/2006 | Kulkarni et al. |
| 2006/0168070 A1 | 7/2006 | Thompson et al. |
| 2006/0168154 A1 | 7/2006 | Zhang et al. |
| 2006/0171365 A1 | 8/2006 | Borella |
| 2006/0179153 A1 | 8/2006 | Lee et al. |
| 2006/0182103 A1 | 8/2006 | Martini et al. |
| 2006/0184647 A1 | 8/2006 | Dixit et al. |
| 2006/0209669 A1 | 9/2006 | Nishio |
| 2006/0209853 A1 | 9/2006 | Hidaka et al. |
| 2006/0229861 A1 | 10/2006 | Tatsuoka et al. |
| 2006/0230148 A1 | 10/2006 | Forecast et al. |
| 2006/0233106 A1 | 10/2006 | Achlioptas et al. |
| 2006/0235998 A1 | 10/2006 | Stecher et al. |
| 2006/0242300 A1 | 10/2006 | Yumoto et al. |
| 2006/0259320 A1 | 11/2006 | Lasalle et al. |
| 2006/0259980 A1 | 11/2006 | Field et al. |
| 2006/0268692 A1 | 11/2006 | Wright et al. |
| 2006/0268704 A1 | 11/2006 | Ansari et al. |
| 2006/0268893 A1 | 11/2006 | Lataretu |
| 2006/0270341 A1 | 11/2006 | Kim et al. |
| 2006/0282442 A1 | 12/2006 | Lennon et al. |
| 2006/0291483 A1 | 12/2006 | Sela |
| 2006/0294054 A1 | 12/2006 | Kudo et al. |
| 2006/0294194 A1 | 12/2006 | Graveline et al. |
| 2007/0005807 A1 | 1/2007 | Wong |
| 2007/0006293 A1 | 1/2007 | Balakrishnan et al. |
| 2007/0016613 A1 | 1/2007 | Foresti et al. |
| 2007/0016662 A1 | 1/2007 | Desai et al. |
| 2007/0019636 A1 | 1/2007 | Lau et al. |
| 2007/0019658 A1 | 1/2007 | Park et al. |
| 2007/0038994 A1 | 2/2007 | Davis et al. |
| 2007/0050843 A1 | 3/2007 | Manville et al. |
| 2007/0058670 A1 | 3/2007 | Konduru et al. |
| 2007/0064661 A1 | 3/2007 | Sood et al. |
| 2007/0067771 A1 | 3/2007 | Kulbak et al. |
| 2007/0083646 A1 | 4/2007 | Miller et al. |
| 2007/0086335 A1 | 4/2007 | Mccanne et al. |
| 2007/0088822 A1 | 4/2007 | Coile et al. |
| 2007/0094741 A1 | 4/2007 | Lynn et al. |
| 2007/0106796 A1 | 5/2007 | Kudo et al. |
| 2007/0107048 A1 | 5/2007 | Halls et al. |
| 2007/0110043 A1 | 5/2007 | Girard |
| 2007/0112775 A1 | 5/2007 | Ackerman |
| 2007/0118879 A1 | 5/2007 | Yeun |
| 2007/0124415 A1 | 5/2007 | Lev-Ran et al. |
| 2007/0124502 A1 | 5/2007 | Li |
| 2007/0130255 A1 | 6/2007 | Wolovitz et al. |
| 2007/0143851 A1 | 6/2007 | Nicodemus et al. |
| 2007/0147246 A1 | 6/2007 | Hurley |
| 2007/0162891 A1 | 7/2007 | Burner et al. |
| 2007/0168320 A1 | 7/2007 | Borthakur et al. |
| 2007/0168525 A1 | 7/2007 | Deleon et al. |
| 2007/0192543 A1 | 8/2007 | Naik et al. |
| 2007/0195779 A1 | 8/2007 | Judge et al. |
| 2007/0220598 A1 | 9/2007 | Salowey et al. |
| 2007/0233809 A1 | 10/2007 | Brownell et al. |
| 2007/0233826 A1 | 10/2007 | Tindal et al. |
| 2007/0250560 A1 | 10/2007 | Wein et al. |

(56) References Cited

U.S. PATENT DOCUMENTS

| | | |
|---|---|---|
| 2007/0258451 A1 | 11/2007 | Bouat |
| 2007/0297410 A1 | 12/2007 | Toon et al. |
| 2007/0297551 A1 | 12/2007 | Choi |
| 2008/0004022 A1 | 1/2008 | Johannesson et al. |
| 2008/0008202 A1 | 1/2008 | Terrell et al. |
| 2008/0010372 A1 | 1/2008 | Khedour et al. |
| 2008/0022059 A1 | 1/2008 | Zimmerer et al. |
| 2008/0025297 A1 | 1/2008 | Kashyap |
| 2008/0031258 A1 | 2/2008 | Acharya et al. |
| 2008/0034136 A1 | 2/2008 | Ulenas |
| 2008/0072303 A1 | 3/2008 | Syed |
| 2008/0108405 A1 | 5/2008 | Brosnan et al. |
| 2008/0120370 A1 | 5/2008 | Chan et al. |
| 2008/0120592 A1 | 5/2008 | Tanguay et al. |
| 2008/0133518 A1 | 6/2008 | Kapoor et al. |
| 2008/0134311 A1 | 6/2008 | Medvinsky et al. |
| 2008/0141246 A1 | 6/2008 | Kuck et al. |
| 2008/0148340 A1 | 6/2008 | Powell et al. |
| 2008/0151860 A1 | 6/2008 | Sakoda et al. |
| 2008/0151931 A1 | 6/2008 | Moran et al. |
| 2008/0159145 A1 | 7/2008 | Muthukrishnan et al. |
| 2008/0165801 A1 | 7/2008 | Sheppard |
| 2008/0178278 A1 | 7/2008 | Grinstein et al. |
| 2008/0192770 A1 | 8/2008 | Burrows et al. |
| 2008/0201599 A1 | 8/2008 | Ferraiolo et al. |
| 2008/0205613 A1 | 8/2008 | Lopez |
| 2008/0208917 A1 | 8/2008 | Smoot et al. |
| 2008/0222646 A1 | 9/2008 | Sigal et al. |
| 2008/0225710 A1 | 9/2008 | Raja et al. |
| 2008/0229415 A1 | 9/2008 | Kapoor et al. |
| 2008/0235508 A1 | 9/2008 | Ran et al. |
| 2008/0239986 A1 | 10/2008 | Ku et al. |
| 2008/0243619 A1 | 10/2008 | Sharman et al. |
| 2008/0243819 A1 | 10/2008 | Sareen et al. |
| 2008/0253395 A1 | 10/2008 | Pandya |
| 2008/0256224 A1 | 10/2008 | Kaji et al. |
| 2008/0263401 A1 | 10/2008 | Stenzel |
| 2008/0270578 A1 | 10/2008 | Zhang et al. |
| 2008/0279200 A1 | 11/2008 | Shalzkamer et al. |
| 2008/0281908 A1 | 11/2008 | Mccanne et al. |
| 2008/0281944 A1 | 11/2008 | Vome et al. |
| 2008/0282354 A1 | 11/2008 | Wobber et al. |
| 2008/0288661 A1 | 11/2008 | Galles |
| 2008/0301760 A1 | 12/2008 | Lim |
| 2008/0316922 A1 | 12/2008 | Riddle et al. |
| 2009/0028337 A1 | 1/2009 | Balabine et al. |
| 2009/0049230 A1 | 2/2009 | Pandya |
| 2009/0052379 A1 | 2/2009 | Suh |
| 2009/0063665 A1 | 3/2009 | Bagepalli et al. |
| 2009/0070617 A1 | 3/2009 | Arimilli et al. |
| 2009/0077618 A1 | 3/2009 | Pearce et al. |
| 2009/0077619 A1 | 3/2009 | Boyce |
| 2009/0080440 A1 | 3/2009 | Balyan et al. |
| 2009/0089487 A1 | 4/2009 | Kwon et al. |
| 2009/0094311 A1 | 4/2009 | Awadallah et al. |
| 2009/0094610 A1 | 4/2009 | Sukirya |
| 2009/0097480 A1 | 4/2009 | Curtis et al. |
| 2009/0106413 A1 | 4/2009 | Salo et al. |
| 2009/0119504 A1 | 5/2009 | van Os et al. |
| 2009/0124525 A1 | 5/2009 | Futterer et al. |
| 2009/0125496 A1 | 5/2009 | Wexler et al. |
| 2009/0125532 A1 | 5/2009 | Wexler et al. |
| 2009/0125955 A1 | 5/2009 | Delorme |
| 2009/0138314 A1 | 5/2009 | Bruce |
| 2009/0138749 A1 | 5/2009 | Moll et al. |
| 2009/0141891 A1 | 6/2009 | Boyen et al. |
| 2009/0156204 A1 | 6/2009 | Kim et al. |
| 2009/0157678 A1 | 6/2009 | Turk |
| 2009/0161542 A1 | 6/2009 | Ho |
| 2009/0182874 A1 | 7/2009 | Morford et al. |
| 2009/0187915 A1 | 7/2009 | Chew et al. |
| 2009/0193126 A1 | 7/2009 | Agarwal et al. |
| 2009/0193513 A1 | 7/2009 | Agarwal et al. |
| 2009/0196282 A1 | 8/2009 | Fellman et al. |
| 2009/0217163 A1 | 8/2009 | Jaroker |
| 2009/0217386 A1 | 8/2009 | Schneider |
| 2009/0228956 A1 | 9/2009 | He et al. |
| 2009/0241176 A1 | 9/2009 | Beletski et al. |
| 2009/0248893 A1 | 10/2009 | Richardson et al. |
| 2009/0254969 A1 | 10/2009 | Parker et al. |
| 2009/0265396 A1 | 10/2009 | Ram et al. |
| 2009/0265467 A1 | 10/2009 | Peles |
| 2009/0287935 A1 | 11/2009 | Aull et al. |
| 2009/0289828 A1 | 11/2009 | Hinchey |
| 2009/0292957 A1 | 11/2009 | Bower et al. |
| 2009/0296624 A1 | 12/2009 | Ryu et al. |
| 2009/0300161 A1 | 12/2009 | Pruitt et al. |
| 2009/0300407 A1 | 12/2009 | Kamath et al. |
| 2009/0316708 A1 | 12/2009 | Yahyaoui et al. |
| 2009/0319600 A1 | 12/2009 | Sedan et al. |
| 2010/0011434 A1 | 1/2010 | Kay |
| 2010/0017846 A1 | 1/2010 | Huang et al. |
| 2010/0023454 A1 | 1/2010 | Exton et al. |
| 2010/0023582 A1 | 1/2010 | Pedersen et al. |
| 2010/0027521 A1 | 2/2010 | Huber et al. |
| 2010/0039937 A1 | 2/2010 | Ramanujan et al. |
| 2010/0042743 A1 | 2/2010 | Jeon et al. |
| 2010/0061232 A1 | 3/2010 | Zhou et al. |
| 2010/0064001 A1 | 3/2010 | Daily |
| 2010/0070476 A1 | 3/2010 | O'Keefe et al. |
| 2010/0071048 A1 | 3/2010 | Novak et al. |
| 2010/0082513 A1 | 4/2010 | Liu |
| 2010/0093318 A1 | 4/2010 | Zhu et al. |
| 2010/0115236 A1 | 5/2010 | Bataineh et al. |
| 2010/0122091 A1 | 5/2010 | Huang et al. |
| 2010/0131654 A1 | 5/2010 | Malakapalli et al. |
| 2010/0136967 A1 | 6/2010 | Du et al. |
| 2010/0138921 A1 | 6/2010 | Na et al. |
| 2010/0146608 A1* | 6/2010 | Batie .................. G06F 21/32 726/7 |
| 2010/0150154 A1 | 6/2010 | Viger et al. |
| 2010/0154031 A1 | 6/2010 | Montemurro et al. |
| 2010/0161773 A1 | 6/2010 | Prahlad et al. |
| 2010/0165877 A1 | 7/2010 | Shukla et al. |
| 2010/0177780 A1 | 7/2010 | Ophir et al. |
| 2010/0179984 A1 | 7/2010 | Sebastian |
| 2010/0188976 A1 | 7/2010 | Rahman et al. |
| 2010/0190492 A1 | 7/2010 | Jiang |
| 2010/0198646 A1 | 8/2010 | Mikan et al. |
| 2010/0228814 A1 | 9/2010 | Mckenna et al. |
| 2010/0228819 A1 | 9/2010 | Wei |
| 2010/0242092 A1 | 9/2010 | Harris et al. |
| 2010/0246602 A1 | 9/2010 | Barreto et al. |
| 2010/0250497 A1 | 9/2010 | Redlich et al. |
| 2010/0251330 A1 | 9/2010 | Kroeselberg et al. |
| 2010/0251352 A1 | 9/2010 | Zarchy et al. |
| 2010/0274772 A1 | 10/2010 | Samuels |
| 2010/0278733 A1 | 11/2010 | Nakayama et al. |
| 2010/0299451 A1 | 11/2010 | Mgang et al. |
| 2010/0306169 A1 | 12/2010 | Pishevar et al. |
| 2010/0322250 A1 | 12/2010 | Shetty et al. |
| 2010/0325277 A1 | 12/2010 | Muthiah et al. |
| 2011/0040889 A1 | 2/2011 | Garrett et al. |
| 2011/0047620 A1 | 2/2011 | Mahaffey et al. |
| 2011/0055921 A1 | 3/2011 | Narayanaswamy et al. |
| 2011/0066718 A1 | 3/2011 | Susai et al. |
| 2011/0066736 A1 | 3/2011 | Mitchell et al. |
| 2011/0072321 A1 | 3/2011 | Dhuse |
| 2011/0075667 A1 | 3/2011 | Li et al. |
| 2011/0098087 A1 | 4/2011 | Tseng |
| 2011/0107077 A1 | 5/2011 | Henderson et al. |
| 2011/0113095 A1 | 5/2011 | Hatami-Hanza |
| 2011/0116377 A1 | 5/2011 | Batz et al. |
| 2011/0116382 A1 | 5/2011 | Mccann et al. |
| 2011/0119517 A1 | 5/2011 | Beeco et al. |
| 2011/0153822 A1 | 6/2011 | Rajan et al. |
| 2011/0154443 A1 | 6/2011 | Thakur et al. |
| 2011/0158090 A1 | 6/2011 | Riley et al. |
| 2011/0167479 A1 | 7/2011 | Maes |
| 2011/0173295 A1 | 7/2011 | Bakke et al. |
| 2011/0184733 A1 | 7/2011 | Yu et al. |
| 2011/0185082 A1 | 7/2011 | Thompson |
| 2011/0188415 A1 | 8/2011 | Graziano |
| 2011/0197059 A1 | 8/2011 | Klein et al. |

(56) References Cited

U.S. PATENT DOCUMENTS

| | | |
|---|---|---|
| 2011/0202466 A1 | 8/2011 | Carter |
| 2011/0202613 A1 | 8/2011 | Craig et al. |
| 2011/0202676 A1 | 8/2011 | Craig et al. |
| 2011/0213911 A1 | 9/2011 | Eidus et al. |
| 2011/0217978 A1 | 9/2011 | Horn |
| 2011/0246800 A1 | 10/2011 | Accpadi et al. |
| 2011/0273984 A1 | 11/2011 | Hsu et al. |
| 2011/0277016 A1 | 11/2011 | Hockings et al. |
| 2011/0282997 A1 | 11/2011 | Prince et al. |
| 2011/0314178 A1 | 12/2011 | Kanode et al. |
| 2011/0321122 A1 | 12/2011 | Mwangi et al. |
| 2012/0005347 A1 | 1/2012 | Chen et al. |
| 2012/0016994 A1 | 1/2012 | Nakamura et al. |
| 2012/0023190 A1 | 1/2012 | Backholm et al. |
| 2012/0030341 A1 | 2/2012 | Jensen et al. |
| 2012/0039262 A1 | 2/2012 | Walsh |
| 2012/0039341 A1 | 2/2012 | Latif et al. |
| 2012/0041965 A1 | 2/2012 | Vasquez et al. |
| 2012/0042395 A1 | 2/2012 | Jain et al. |
| 2012/0063314 A1 | 3/2012 | Pignataro et al. |
| 2012/0066489 A1 | 3/2012 | Ozaki et al. |
| 2012/0079055 A1 | 3/2012 | Robinson |
| 2012/0089410 A1 | 4/2012 | Mikurak |
| 2012/0089677 A1 | 4/2012 | Shafran et al. |
| 2012/0101952 A1 | 4/2012 | Raleigh et al. |
| 2012/0117028 A1 | 5/2012 | Gold et al. |
| 2012/0124372 A1 | 5/2012 | Dilley et al. |
| 2012/0129488 A1 | 5/2012 | Patterson et al. |
| 2012/0150805 A1 | 6/2012 | Pafumi et al. |
| 2012/0166582 A1 | 6/2012 | Binder |
| 2012/0191847 A1 | 7/2012 | Nas et al. |
| 2012/0195273 A1 | 8/2012 | Iwamura et al. |
| 2012/0198043 A1 | 8/2012 | Hesketh et al. |
| 2012/0224531 A1 | 9/2012 | Karuturi et al. |
| 2012/0233698 A1 | 9/2012 | Watters et al. |
| 2012/0236824 A1 | 9/2012 | Mccann et al. |
| 2012/0236871 A1 | 9/2012 | Wallace et al. |
| 2012/0254293 A1 | 10/2012 | Winter et al. |
| 2012/0257506 A1 | 10/2012 | Bazlamacci et al. |
| 2012/0258766 A1 | 10/2012 | Cho et al. |
| 2012/0259722 A1 | 10/2012 | Mikurak |
| 2012/0310980 A1 | 12/2012 | Hepper |
| 2012/0311153 A1 | 12/2012 | Morgan |
| 2012/0317266 A1 | 12/2012 | Abbott |
| 2013/0003106 A1 | 1/2013 | Nishida et al. |
| 2013/0029726 A1 | 1/2013 | Berionne et al. |
| 2013/0058229 A1 | 3/2013 | Casado et al. |
| 2013/0079055 A1 | 3/2013 | Jouin |
| 2013/0091002 A1 | 4/2013 | Christie et al. |
| 2013/0094519 A1 | 4/2013 | Mann et al. |
| 2013/0156017 A1 | 6/2013 | Hori et al. |
| 2013/0163758 A1 | 6/2013 | Swaminathan et al. |
| 2013/0182713 A1 | 7/2013 | Giacomoni et al. |
| 2013/0198322 A1 | 8/2013 | Oran et al. |
| 2013/0205361 A1 | 8/2013 | Narayanaswamy et al. |
| 2013/0238472 A1 | 9/2013 | Fan et al. |
| 2013/0260731 A1 | 10/2013 | Vihtari et al. |
| 2013/0279401 A1 | 10/2013 | Sander et al. |
| 2013/0336118 A1 | 12/2013 | Shaw et al. |
| 2013/0336122 A1 | 12/2013 | Baruah et al. |
| 2013/0346549 A1 | 12/2013 | Craig et al. |
| 2014/0006772 A1 | 1/2014 | Qureshi et al. |
| 2014/0025823 A1 | 1/2014 | Szabo et al. |
| 2014/0025949 A1 | 1/2014 | Kay et al. |
| 2014/0040478 A1 | 2/2014 | Hsu et al. |
| 2014/0059678 A1 | 2/2014 | Parker |
| 2014/0071895 A1 | 3/2014 | Bane et al. |
| 2014/0082695 A1* | 3/2014 | Alsina ............... H04L 63/0807 726/3 |
| 2014/0082730 A1 | 3/2014 | Vashist et al. |
| 2014/0095661 A1 | 4/2014 | Knowles et al. |
| 2014/0099945 A1 | 4/2014 | Singh et al. |
| 2014/0105069 A1 | 4/2014 | Potnuru |
| 2014/0108649 A1 | 4/2014 | Barton et al. |
| 2014/0138858 A1 | 5/2014 | Cincotta |
| 2014/0162705 A1 | 6/2014 | De Wit et al. |
| 2014/0171089 A1 | 6/2014 | Janakiraman et al. |
| 2014/0173232 A1 | 6/2014 | Reohr et al. |
| 2014/0173687 A1 | 6/2014 | Dimitrakos et al. |
| 2014/0187199 A1 | 7/2014 | Fan et al. |
| 2014/0189804 A1 | 7/2014 | Lehmann et al. |
| 2014/0269484 A1 | 9/2014 | Dankberg et al. |
| 2014/0286316 A1 | 9/2014 | Park et al. |
| 2014/0304830 A1 | 10/2014 | Gammon |
| 2014/0317404 A1 | 10/2014 | Carlson et al. |
| 2014/0337607 A1 | 11/2014 | Peterson et al. |
| 2014/0368601 A1 | 12/2014 | Decharms |
| 2014/0379915 A1 | 12/2014 | Fang et al. |
| 2015/0023160 A1 | 1/2015 | Alisaw |
| 2015/0040191 A1 | 2/2015 | Andreev et al. |
| 2015/0058595 A1 | 2/2015 | Gura et al. |
| 2015/0241941 A1 | 8/2015 | Luna et al. |
| 2015/0281279 A1 | 10/2015 | Smith et al. |
| 2015/0281961 A1 | 10/2015 | Lee et al. |
| 2015/0324577 A1 | 11/2015 | Singh et al. |
| 2015/0372976 A1 | 12/2015 | Lonas et al. |
| 2016/0014119 A1* | 1/2016 | Inoue ............... H04L 63/0853 726/9 |
| 2016/0072815 A1 | 3/2016 | Rieke et al. |
| 2016/0080402 A1 | 3/2016 | Smith et al. |
| 2016/0087921 A1 | 3/2016 | Gil et al. |
| 2016/0088021 A1 | 3/2016 | Jayanti Venkata et al. |
| 2016/0088475 A1 | 3/2016 | Zhang |
| 2016/0092685 A1 | 3/2016 | Tse et al. |
| 2016/0099963 A1 | 4/2016 | Mahaffey et al. |
| 2016/0127318 A1 | 5/2016 | Hua et al. |
| 2016/0142294 A1 | 5/2016 | Mann et al. |
| 2016/0142409 A1* | 5/2016 | Frei ............... H04L 63/0884 713/176 |
| 2016/0142497 A1 | 5/2016 | Ullrich |
| 2016/0212754 A1 | 7/2016 | Mendiola et al. |
| 2016/0226913 A1 | 8/2016 | Sood et al. |
| 2016/0255117 A1 | 9/2016 | Sinha et al. |
| 2016/0285880 A1 | 9/2016 | Nakamura et al. |
| 2016/0335129 A1 | 11/2016 | Behera et al. |
| 2016/0337863 A1 | 11/2016 | Robinson et al. |
| 2017/0076522 A1 | 3/2017 | Ives-Halperin et al. |
| 2017/0099292 A1 | 4/2017 | Kelley et al. |
| 2017/0142086 A1 | 5/2017 | Chen et al. |
| 2017/0222813 A1* | 8/2017 | Lin ............... H04W 12/03 |
| 2017/0223138 A1* | 8/2017 | Amiri ............... H04L 67/02 |
| 2017/0272607 A1 | 9/2017 | Tamura |
| 2017/0346830 A1 | 11/2017 | Goldfarb et al. |
| 2017/0346856 A1 | 11/2017 | Newell et al. |
| 2017/0359370 A1 | 12/2017 | Humphries et al. |
| 2017/0374061 A1 | 12/2017 | Jayanti Venkata et al. |
| 2018/0004930 A1 | 1/2018 | Csinger et al. |
| 2018/0007087 A1 | 1/2018 | Grady et al. |
| 2018/0048665 A1 | 2/2018 | Shulman et al. |
| 2018/0124060 A1 | 5/2018 | Dildilian et al. |
| 2018/0174189 A1 | 6/2018 | Joseph |
| 2018/0324158 A1* | 11/2018 | Brickell ............... H04L 63/061 |
| 2019/0190723 A1* | 6/2019 | Lee ............... H04L 63/0884 |

FOREIGN PATENT DOCUMENTS

| | | |
|---|---|---|
| EP | 817040 A2 | 1/1998 |
| EP | 744850 A3 | 5/1999 |
| EP | 1081918 A2 | 3/2001 |
| EP | 744850 B1 | 10/2002 |
| EP | 817040 A3 | 1/2003 |
| EP | 1081918 A3 | 12/2003 |
| EP | 1081918 B1 | 10/2006 |
| EP | 1916797 A1 | 4/2008 |
| EP | 2744172 A1 | 6/2014 |
| JP | 08021924 A | 1/1996 |
| JP | 08021924 B | 3/1996 |
| JP | 08021924 B2 | 3/1996 |
| JP | 2000183935 A | 6/2000 |
| WO | 0239696 A2 | 5/2002 |
| WO | 0239696 A3 | 4/2003 |
| WO | 2006091040 A1 | 8/2006 |
| WO | 2011002777 A2 | 1/2011 |

(56) References Cited

FOREIGN PATENT DOCUMENTS

OTHER PUBLICATIONS

"Transmission Control Protocol," Darpa Internet Program Protocol Specification, RFC: 793, 82 pp, Sep. 1981.
Darpa Internet Program, "Transmission Control Protocol", Protocol Specification, RFC: 793, pp. 1-82, Sep. 1981.
Floyd et al., "Random Early Detection Gateways For Congestion Avoidance," IEEE/ACM Transactions on Networking, pp. 1-22, Aug. 1993.
Freier et al., "The SSL Protocol," Transport Layer Security Working Group, Internet-Draft, Expire in six months, Version 3 0, pp. 1-64, Nov. 18, 1996.
Padmanabhan et al., "Using Predictive Prefetching to Improve World Wide Web Latency," Acm Sigcom Computer Communication Review, vol. 26(3), pp. 1-15, Jul. 1996.
Akkiraju et al., "Enabling Enterprise Multihoming With Cisco IOS Network Address Translation (NAT)," Cisco Systems, Inc., White Paper, pp. 1-25,1997.
Modiano E., "Scheduling Algorithms for Message Transmission Over the GBS Satellite," Lincoln Laboratory, Massachusetts Institute of Technology, Technical Report 1035, pp. 1-25, Aug. 11, 1997.
Bates et al., "Scalable Support For Multi-Homed Multi-Provider Connectivity," Network Working Group, Request for Comments 2260, Category Informational, pp. 1-12, Jan. 1998.
Nichols et al., "Definition of the Differentiated Services Field (DS Field) in the IPv4 and IPv6 Headers," Network Working Group, Request For Comments:2474, Obsoletes 1455 and 1349, Standards Track, pp. 1-19, Dec. 1998.
Dierks et al., "The TLS Protocol," Network Working Group, RFC 2246, Version 1.0, pp. 1-75, Jan. 1999.
"Servlet/Applet/HTML Authentication Process With Single Sign-On," Research Disclosure No. 429128, Internation Business Machines Corporation, 2 pp, Jan. 2000.
"UDDI Overview," Powerpoint Presentation, slides 1-21, Sep. 6, 2000.
IBM Corporation, "Servlet/Applet/HTML Authentication Process With Single Sign-On," Research Disclosure 129128, pp. 163-164, Jan. 2000.
Woo Thomas Y. C., "A Modular Approach to Packet Classification: Algorithms and Results", Nineteenth Annual Conference of the IEEE Computer and Communications Societies, 10 pp, Mar. 26-30, 2000.
"Routing Global Internet Users to the Appropriate Data Center and Applications Using F5's 3-DNS Controller," F5 Networks, Inc, 4 pp, Aug. 2001.
"Using F5's 3-DNS Controller To Provide High Availability Between Two or More Data Centers," F5 Networks, Inc., 3 pp. Aug. 2001.
"Why UDDI Will Succeed, Quietly: Two Factors Push Web Services Forward," The Stencil Group, Inc., pp. 1-7, Apr. 2001.
Gupta et al., "Algorithms For Packet Classification," Stanford University, IEEE Network, pp. 24-32, Mar./Apr. 2001.
Hochmuth P., "F5, CacheFlow pump up content-delivery lines," Network World Fusion, 1 page, May 4, 2001.
Ilvesmaki et al., "On the Capabilties of Application Level Traffic Measurements to Differentiate and Classify ntemet Traffic," Proceedings to SPIE—The International Society for Optical Engineering, vol. 4523, pp. 1-11, Jul. 24, 2001.
Rosen et al., "MPLS Label Stack Encoding," Network Working Group, Request for Comments 3032, Category Standards Track, pp. 1-22, Jan. 2001.
Sleeper, Brent, "Why UDDI Will succeed, Quietly: Two Factors Push Web Services Forward," The Stencil Group, pp 1-7, Apr. 2001.
"The Evolution of UDDI", Uddi.org White Paper, The Stencil Group, Inc., pp. 1-15, Jul. 19, 2002.
Baer et al., "The Elements of Web Services," ADTmag.com, pp. 1-6, Dec. 2002.
Needham J., "Link Load Balancers Smooth Web Traffic," F5 Networks Inc., Network World Fusion, 1 pp, Sep. 16, 2002.
Ott et al., "A Mechanism for TCP-Friendly Transport-Level Protocol Coordination", Proceedings of the 2002 USENIX Annual Technical Conference, pp. 1-14, Jun. Oct. 15, 2002.
Shohoud Yasser, "Building XML Web Services with VB.NET and VB 6," Addison Wesley, Chapter 1, 15 pp, Sep. 17, 2002.
"Application Layer Processing (ALP)," Chapter 9, Crescendo Networks, pp. 168-186, CN-5000E/5500E, Foxit Software company, (2003-2009).
"BIG-IP Link Controller High Avaliability and Intelligent Routing For Multi-Homed Networks," F5 Networks, Inc., pp. 1-5, 2003.
"Windows Server 2003 Kerberos Extensions," Microsoft TechNet, Microsoft Corporation, pp. 1-8, Jul. 31, 2004.
Atkinson et al., "UDDI Spec Technical Committee Specification," Version 3.0.1, pp. 1-383, (http://uddi.org/pubs/Liddi_v3.htm), Oct. 14, 2003.
Big-IP Link Controller, "High Availability and Intelligent Routing for Multi-Homed Networks," F5 Networks Inc., pp. 1-5, 2003.
Calhoun et al., "Diameter Base Protocol," Network Working Group, Request For Comments 3588, Category Standards Track, pp. 1-147, Sep. 2003.
Crowcroft Jon, "Scheduling and Queue Management," DigiComm II, pp. 1-32, 2003.
Heinz II G., "Priorities in Stream Transmission Control Protocol (SCTP) Multistreaming," Thesis submitted to the Faculty of the University of Delaware, pp. 1-35, Spring 2003.
Schilit, Bill, "Bootstrapping Location-Enhanced Web Services," Intel Research, Broadcast live via the Internet, 1 op, Dec. 4, 2003.
Seeley, Rich, "Can Infravio Technology Revive UDDI?," Application Development Trends (ADTmag), 1 pp, Oct. 22, 2003.
Sommers Frank, "Federating UDDI Registries," What's New in UDDI 3.0 - Part 3, Web Services Papers, pp. 1-4, Feb. 9, 2003.
Sommers Frank, "The Road to Oasis," What's New in UDDI 3.0 - Part 1, Web Services Papers, pp. 1-4, Jan. 27, 2003.
Sommers Frank, "UDDr's Evolving API," What's New in UDDI 3.0 - Part 2, Web Services Papers, pp. 1-7, Feb. 3, 2003.
Williams et al., "Forwarding Authentication," The Ultimate Windows Server 2003 System Administrator's Guide, 2 pp, Apr. 18, 2003.
"A Link Load Balancing Solution for Multi-Homed Networks", F5 Networks Inc., White Paper, pp. 1-6, Oct. 2004.
Fajardo, Victor I., "Open Diameter Software Architecture," Version 1.0.7, pp. 1-6, Jun. 25, 2004.
Lamonica M., "Infravio Spiffs Up Web Services Registry Idea," CNEI News.com, pp. 1-2, May 11, 2004.
Zhu et al., "Generating KDC Referrals to Locate Kerberos Realms," Network Working Group, Internet-Draft, Obsoletes 2478 (if approved), Microsoft Corporation, pp. 1-17, Oct. 25, 2004.
"Traffic Surges: Attack or Legitimate," Powerpoint Presentation, Citrix Systemns, Inc., slides 1-12, 2005.
Kawamoto D., "Amazon files for Web services patent," CNEI News.com, pp. 1-2, Jul. 28, 2005.
Wang Bing, "Priority and Realtime Data Transfer Over The Best-Effort Internet," Dissertation Presentation, University of Massachusetts, 24 pp, Sep. 2005.
"Configuration Guide for Local Traffic Management," Version 9.2.2, Publication No. MAN-0182-01, F5 Networks, Inc., 406 pp, Jan. 12, 2006.
"F5 WANJet CFS Acceleration," F5 Networks, Inc., White Paper, pp. 1-5, Mar. 2006.
"Signaling Delivery Controller SS7 Diameter Interworking Function 4.4," Version 2, F5 Networking, Inc., Catalog No. FD-015-44-35, pp. 1-50, May 2015.
"Signaling Delivery Controller User Guide 4.4," Version 2, F5 Networks, Inc., Catalog No. RG-015-44-22, pp. 1-267, Jun. 2015.
BIG-IP® Access Policy Manager®: Application Access, Version 12.0, Publication No. MAN-0360-04, F5 Networks, Inc., pp. 1-66, Sep. 1, 2015.
BIG-IP® Access Policy Manager®: Edge Client® and Application Configuration, Version 12.0, Publication No. MAN-0462-03, F5 Networks, Inc., pp. 1-72, Sep. 1, 2015.
BIG-IP® Access Policy Manager®: Implementations, Version 12.0, Publication No. MAN-0508-02, F5 Networks, Inc., pp. 1-108, Sep. 1, 2015.

(56) References Cited

OTHER PUBLICATIONS

BIG-IP® Access Policy Manager®: Network Access, Version 12.0, Publication No. MAN-0362-08, F5 Networks, Inc., pp. 1-108, Sep. 1, 2015.
BIG-IP® Access Policy Manager®: Secure Web Gateway Implementations, Version 11.6, Publication No. MAN-0504-01, F5 Networks, Inc., pp. 1-160, Mar. 4, 2015.
BIG-IP® Analytics: Implementations, Version 12.0, Publication No. Man-0357-07, F5 Networks, Inc., pp. 1-50, Sep. 1, 2015.
F5 Signaling Delivery Controller, Release Notes, F5 Networks Inc., Catalog No. RG-015-405-56, Version 1, pp. 1-119, Jul. 2015.
Signaling Delivery Controller, Product Description 4.4, F5 Networks Inc., Catalog No. GD-015-44-45, Version 2, pp. 1-66, May 2015.
Signaling Delivery Controller, Release Notes 4.4 CF 4, F5 Networks Inc., Catalog No. RG-015-44-61, Version 2, pp. 1-54, Jun. 2015.
Signaling Delivery Controller, SS7 Diameter Interworking Function 4.4, F5 Networks Inc., Catalog No. FD-015-44 35, Version 2, pp. 1-50, May 2015.
BIG-IP Access Policy Management Operations Guide, Publication No. Big-IP APMOps-02 1, F5 Networks, Inc., pp. 1-168, Jul. 2016.
BIG-IP® Application Security Manager: Implementations, Version 12.0, Publication No. Man-0358-08, F5 Networks, Inc., pp. 1-352, Mar. 11, 2016.
Release Note: BIG-IP Access Policy Manager (APM), Version 11.6.1, F5 Networks, Inc., pp. 1-9, Aug. 9, 2016.
"TMOS Operations Guide," F5 Networks, Inc., pp. 1-236, Aug. 2017.
BIG-IP Access Policy Manager, Release Notes, V12.0.0, F5 Networks, Inc., pp. 1-50, Jun. 19, 2017.
Fielding et al., "Hypertext Transfer Protocol—HTTP/1.1," Network Working Group, Request for Comments 2068, Category Standards Track, pp. 1-162, Jan. 1997.
Fielding et al., "Hypertext Transfer Protocol—HTTP/1.1," Network Working Group, Request for Comments 22616, Obsoletes 2068, Category Standards Track, pp. 1-176, Jun. 1999.
Configuration Guide for Local Traffic Management, Version 9.2.2, Publication No. MAN-0182-01, F5 Networks Inc., pp. 1-406, Jan. 12, 2006.
"BIG-IP® Link Controller Reference Guide", Version 4.3, Publication No. MAN-0054-00, F5 Networks Inc., pp. 1-344, Sep. 27, 2007.
"Technology Primer: CIFS Protocol Optimization," Blue Coat Systems, Inc., pp. 1-3, 2007.
Blue Coat, "Technology Primer: CIFS Protocol Optimization," Blue Coat Systems Inc., pp. 1-3, (2007).
Raghavan et al., "Cloud Control with Distributed Rate Limiting", Department of Computer Science and Engineering, University of California, pp. 1-12, SIGCOMM'07, Aug. 27-31, 2007.
Schaefer, Ken, "Iis and Keberos Part 5 - Protocol Transition, Constrained Delegation, S4U2S and S4U2P," pp. 1-24, Jul. 18, 2007.
"Issues With BoNY Upgrade to 4.3," Control Your World, Case Information, Research Log, F5 Networks, Inc., 6 pp, Feb. 26, 2008. Control Your World, Case Information Research and Phone Logs for 'Issues with BoNY upgrade to 43,' F5 Networks, Inc., 6 pages, Feb. 26, 2008.
"F5 Diameter RM," Power Point Presentation, F5 Networks, Inc., slides 1-7, Jul. 16, 2009.
F5 Diameter RM, Powerpoint Document, F5 Networks, Inc., 7 pages, Jul. 16, 2009.
Macvittie L., "Message-Based Load Balancing: Using F5 Solutions to Address the Challenges of Scaling Diameter, RADIUS, and Message-Oriented Protocols," F5 Technical Brief, pp. 1-9, F5 Networks Inc., 2009.
"3-DNS@ Reference Guide," Version 4.5, F5 Networks, Inc., Publications No. MAN-0047-02,260 pp, Mar. 1, 2010.
"BIG-IP® Link Controller Solutions Guide," Version 4.5, F5 Networks, Inc., Publication No. MAN-0053-01, 70 pp, Feb. 27, 2010.
"BIG-IP® Reference Guide," F5 Networks Inc., Version 4.5, Publication No. MAN-0044-01, F5 Networks Inc., pp. 11—Jan. 11, 32 of 645, Feb. 27, 2010.
"CMPP PoC Documentation," Market Research & Releases, 1 pp, Feb. 12, 2010.
"Diameter (Protocol)," From Wikipedia, pp. 1-11, Oct. 19, 2010.
"Diameter MBLB Support Phase 2: Generic Message Based Load Balancing (GMBLB)," pp. 1-10, Last accessed Mar. 29, 2010.
"Respond to Server Depending on TCP," DevCentral Forums, F5 Networks, Inc., pp. 1-6, Mar. 26, 2010.
"Solstice Diameter Requirements," Market Research & Releases, 1 page, (http://mainstreet/sites/PD/Teams/ProdMgtm/MarketResearch/Universal), Jan. 18, 2010.
"Unbundling Roaming Services, An effective way to create competition for roaming services in the European Union," Telekom/Austria Group, Powerpoint Presentation, pp. 1-21, Jul. 14, 2010.
Snoeren et al., "Managing Cloud Resources: Distributed Rate Limited," Building and Programming the Cloud Workshop, UCSDCSE Computer Science and Engineering, pp. 1-38, Jan. 13, 2010.
"Testing for Cross Site Scripting," OWASP Testing Guide v2, pp. 1-5, Jul. 27, 2011.
"EC Tackles Mobile Data Bill Shock," LightReading Networking the Communications Industry, 2 pages, (https://www.lightreading.com/documentasp2doc_id=220822&f_src=lrmobiledailynewsletter), May 11, 2012.
"Oracle® Communications Converged Application Server", Diameter Application Development Guide, Release 5.1, pp. 1-36, Dec. 2012.
"Traffix Signaling Delivery Controller (SDC)," Product Brochure, F5 Networks, Inc., pp. 1-11, 2012.
International Search Report and Written Opinion for International Application No. PCT/US2012/03822/, filed May 16, 2012, pp. 1-11, dated Oct. 19, 2012.
International Search Report for International Patent Application No. PCT/US2012/038228, dated Oct. 19, 2012.
Meyer D., "Europe Agrees on Changes for Cheaper Roaming," ZDNet, pp. 1-2, Mar. 28, 2012.
Stuckmann Peter, "Eu Roaming Regulation—Towards Structural Solutions," European Commission Information Society and Media, Powerpoint Presentation, 22 pp, Mar. 2012.
"Diameter Edge Agent (DEA), SDC Enhanced Diameter Edge Agent (DEA), Tighter Security and Improved Performance in Roaming, Billing and 3rd Party Content Providers," Diameter Edge Agent (DEA)—Traffix Diameter Solutions, pp. 2-3, last accessed Apr. 8, 2013.
"Moving to LTE: Let Technology Work for You With the Signaling Delivery Controller," Signaling delivery Controller (SDC), pp. 2-4, last accessed Apr. 8, 2013.
"Signaling Delivery Controller (SDC)," Moving to LTE: Let Technology Work for You with the Signaling Delivery Controller, pp. 2-4 (http://www.traffixsystems.com/solutions/SDCI), last accessed Apr. 8, 2013.
BIG-IP® Access Policy Manager® Authentication Configuration Guide, Version 11.4, Publication No. MAN-0359-04, F5 Networks, Inc., pp. 1-102, May 15, 2013.
Configuration Guide for BIG-IP® Access Policy Manager®, Version 11.4, Publication No. MAN-0309-05, F5 Networks, Inc., pp. 1-369, Sep. 27, 2013.
International Search Report and Written Opinion for International Application No. PCT/US2013/026615, filed Feb. 19, 2013, pp. 1-10, dated Jul. 4, 2013.
"Deploying the Big-Ip Ltm for Diameter Traffic Management," Deployment Guide, Version 1.2, F5 Networks Inc., pp. 1-21, Aug. 22, 2014.
"F5 Signaling Delivery Controller Product Description," Version 2, F5 Networks, Inc., Catalog No. GD-014-405-4, pp 1-90, Mar. 2014.
"Roaming", Digital Agenda for Europe, pp. 1-4, (http://ec.europa.eu/information_society/activities/roaming/index_en.ntm) Jan. 9, 2014.
BIG-IP® Access Policy Manager®: Application Access, Version 11.6, Publication No. MAN-0360-03, F5 Networks, Inc., pp. 1-50, Aug. 20, 2014.

(56) References Cited

OTHER PUBLICATIONS

BIG-IP® Access Policy Manager®: Authentication and Single Sign-On, Version 11.6, Publication No. MAN-0506-01, F5 Networks, Inc., pp. 1-308, Aug. 20, 2014.
BIG-IP® Access Policy Manager®: Edge Client® and Application Configuration, Version 11.6, Publication No. MAN-0462-02, F5 Networks, Inc., pp. 1-66, Aug. 20, 2014.
BIG-IP® Access Policy Manager®: Implementations, Version 11.6, Publication No. MAN-0508-01, F5 Networks, Inc., pp. 1-98, Aug. 20, 2014.
F5 Signaling Delivery Controller, Product Description, F5 Networks, Inc., Catalog No. GD-014-405-4, Version 2, pp. 1-90, Mar. 2014.
Release Note: BIG-IP Access Policy Manager (APM), Version 11.4.1, F5 Networks, Inc., pp. 1-21, Nov. 7, 2014.
"F5 Signaling Delivery Controller (SDC) User Guide," Version 8, F5 Networks, Inc., Catalog No. RG-014-405-6, pp. 1-266, Feb. 2015.
"F5 Signaling Delivery Controller Release Notes," Version 1, F5 Networks, Inc., Catalog No. RG-015-405-56, pp. 1-119, Jul. 2015.
"Signaling Delivery Controller Product Description 4.4," Version 2, F5 Networks, Inc., Catalog No. GD-015-44-45, 36 pp, May 2015.
"Signaling Delivery Controller Release Notes 4.4 CF 4," Version 2, F5 Networks, Inc., Catalog No. RG-015-44-61, 54 pp, Jun. 2015.

\* cited by examiner

METHODS FOR MANAGING A FEDERATED IDENTITY ENVIRONMENT USING SECURITY AND ACCESS CONTROL DATA AND DEVICES THEREOF

This application claims the benefit of U.S. Provisional Patent Application Ser. No. 62/505,435, filed May 12, 2017, which is hereby incorporated by reference in its entirety.

FIELD

This technology generally relates to methods and devices for network traffic management and, more particularly, to methods for managing a federated identity environment using security and access control data and devices thereof.

BACKGROUND

Federated identity environment provides a way of securely exchanging identity information across internet domains. When a user accesses an application, the service provider component of the application redirects the user to the identity provider for user authentication. The user is authenticated by the identity provider and redirected back to the service provider with a token, and then the service provider validates the token with the identity provider and allows access to the application. When the identity provider has a trust-chaining relationship with another identity provider, the user has to go through more than one identity provider for successful identity verification. Each service provider and each identity provider is configured with their own security and access control checks, and the user/security information gathered and the access control decisions made at one entity are not leveraged by other entities. Additionally, the scope of the access control enforcement is limited at some entities due to their inability to conduct certain checks.

SUMMARY

A method for managing a federated identity environment using security and access control data includes performing one or more first access control checks on a client upon receiving a request to access one or more web applications. A new signature including data associated with the performed one or more access control checks is generated. Next, the client is redirected to a first server with the generated signature to determine when to authorize the client to access the requested one or more web applications. The client is granted access to the requested one or more web applications when the client is determined to be authorized to access the requested one or more web applications based on one or more second access control checks enforced on the client using the generated signature, and wherein data associated with the enforced one or more second access control checks is included in a response signature.

A non-transitory computer readable medium having stored thereon instructions for managing a federated identity environment using security and access control data comprising machine executable code which when executed by at least one processor, causes the processor to perform steps including performing one or more first access control checks on a client upon receiving a request to acces one or more web applications. A new signature including data associated with the performed one or more access control checks is generated. Next, the client is redirected to a first server with the generated signature to determine when to authorize the client to access the requested one or more web applications. The client is granted access to the requested one or more web applications when the client is determined to be authorized to access the requested one or more web applications based on one or more second access control checks enforced on the client using the generated signature, and wherein data associated with the enforced one or more second access control checks is included in a response signature.

A network traffic management apparatus including at least one of configurable hardware logic configured to be capable of implementing or a processor coupled to a memory and configured to execute programmed instructions stored in the memory to perform one or more first access control checks on a client upon receiving a request to access one or more web applications. A new signature including data associated with the performed one or more access control checks is generated. Next, the client is redirected to a first server with the generated signature to determine when to authorize the client to access the requested one or more web applications. The client is granted access to the requested one or more web applications when the client is determined to be authorized to access the requested one or more web applications based on one or more second access control checks enforced on the client using the generated signature, and wherein data associated with the enforced one or more second access control checks is included in a response signature.

A network traffic management system, comprising one or more traffic management apparatuses, client devices, or server devices, the network traffic management system comprising memory comprising programmed instructions stored thereon and one or more processors configured to be capable of executing the stored programmed instructions to perform one or more first access control checks on a client upon receiving a request to access one or more web applications. A new signature including data associated with the performed one or more access control checks is generated. Next, the client is redirected to a first server with the generated signature to determine when to authorize the client to access the requested one or more web applications. The client is granted access to the requested one or more web applications when the client is determined to be authorized to access the requested one or more web applications based on one or more second access control checks enforced on the client using the generated signature, and wherein data associated with the enforced one or more second access control checks is included in a response signature.

This technology provides a number of advantages including providing a method, non-transitory computer readable medium, apparatus, and system that effectively assists with managing a federated identity environment using security and access control data. By leveraging the security and access control decisions across different entities, the disclosed technology provides fast response, authentication optimization and enhanced access control enforcement (like enforcing multi-factor authentication by combining decisions made at different entities).

DETAILED DESCRIPTION

Figure 1:
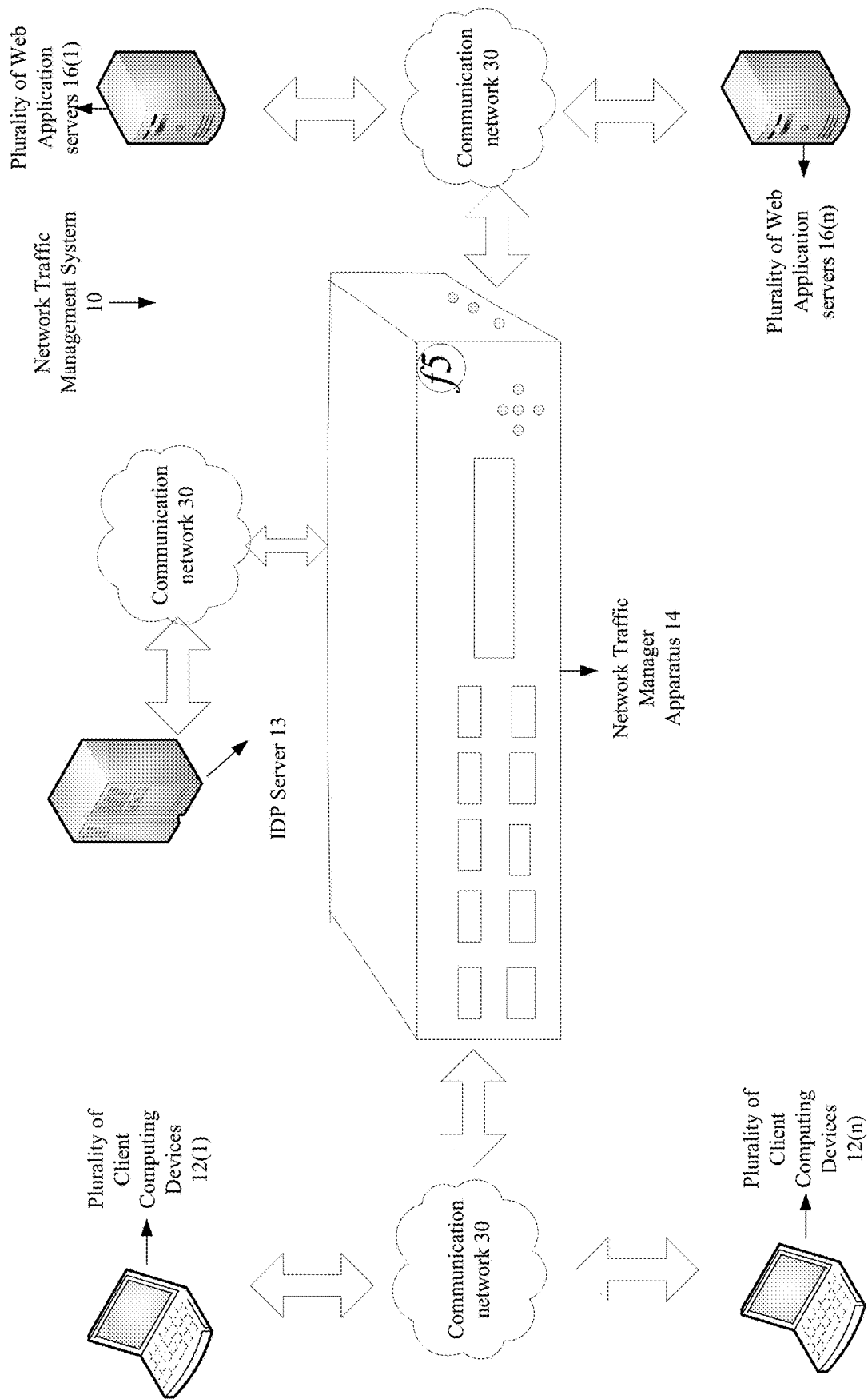
FIG. 1 is an example of a block diagram of a network traffic management system including a network traffic management apparatus for managing a federated identity environment using security and access control data.
Figure 2:
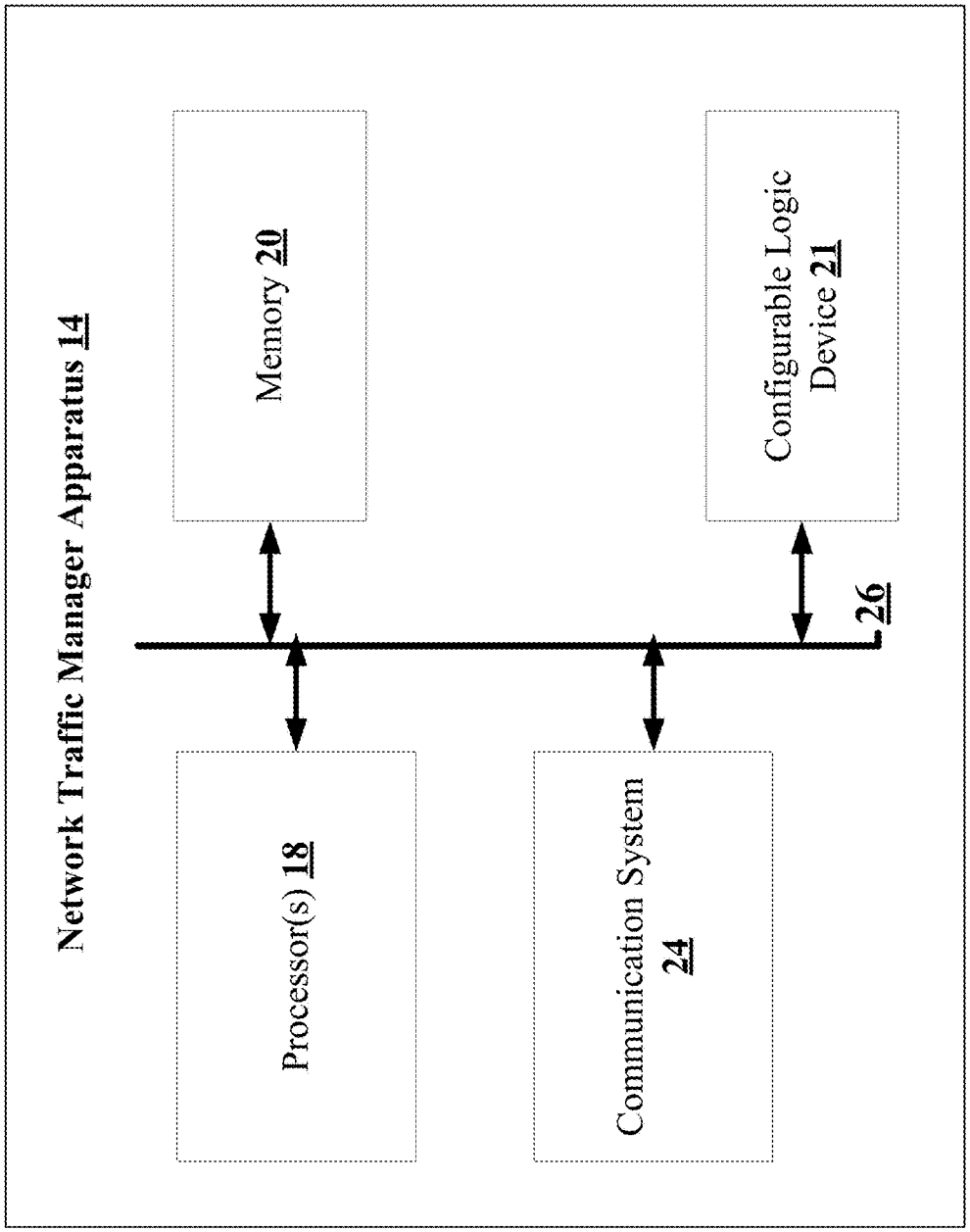
FIG. 2 is an example of a block diagram of a network traffic management apparatus.

An example of a network traffic management system 10 which incorporates a network traffic management system for managing a federated identity environment using security and access control data with the network traffic manager apparatus 14 is illustrated in FIGS. 1 and 2. The network traffic management system 10 includes a plurality of client computing devices 12(1)-12(n), an identity provider (IDP) server 13, a network traffic manager apparatus 14, and a plurality of web application servers 16(1)-16(n) which are coupled together by communication networks 30, although the system can include other types and numbers of systems, devices, components, and/or elements and in other topologies and deployments. While not shown, the network traffic management system 10 may include additional network components, such as routers, switches and other devices, which are well known to those of ordinary skill in the art and thus will not be described here. This technology provides a number of advantages including managing a federated identity environment using security and access control data.

Referring more specifically to FIGS. 1 and 2, the network traffic manager apparatus 14 of the network traffic management system is coupled to the plurality of client computing devices 12(1)-12(n) through the communication network 30, although the plurality of client computing devices 12(1)-12(n) and network traffic manager apparatus 14 may be coupled together via other topologies. Additionally, the network traffic manager apparatus 14 is coupled to the plurality of web application servers 16(1)-16(n) through the communication network 30, although the web application servers 16(1)-16(n) and the network traffic manager apparatus 14 may be coupled together via other topologies. Further, the network traffic manager apparatus 14 is coupled to the IDP server 13 through the communication network 30, although the IDP server 13 and network traffic manager apparatus 14 may be coupled together via other topologies The network traffic manager apparatus 14 assists with managing a federated identity environment using security and access control data as illustrated and described by way of the examples herein, although the network traffic manager apparatus 14 may perform other types and/or numbers of functions. As illustrated in FIG. 2, the network traffic manager apparatus 14 includes processor or central processing unit (CPU) 18, memory 20, optional configurable hardware logic 21, and a communication system 24 which are coupled together by a bus device 26 although the network traffic manager apparatus 14 may comprise other types and numbers of elements in other configurations. In this example, the bus 26 is a PCI Express bus in this example, although other bus types and links may be used.

The processors 18 within the network traffic manager apparatus 14 may execute one or more computer-executable instructions stored in memory 20 for the methods illustrated and described with reference to the examples herein, although the processor can execute other types and numbers of instructions and perform other types and numbers of operations. The processor 18 may comprise one or more central processing units ("CPUs") or general purpose processors with one or more processing cores, such as AMD® processor(s), although other types of processor(s) could be used (e.g., Intel®).

Figure 3:
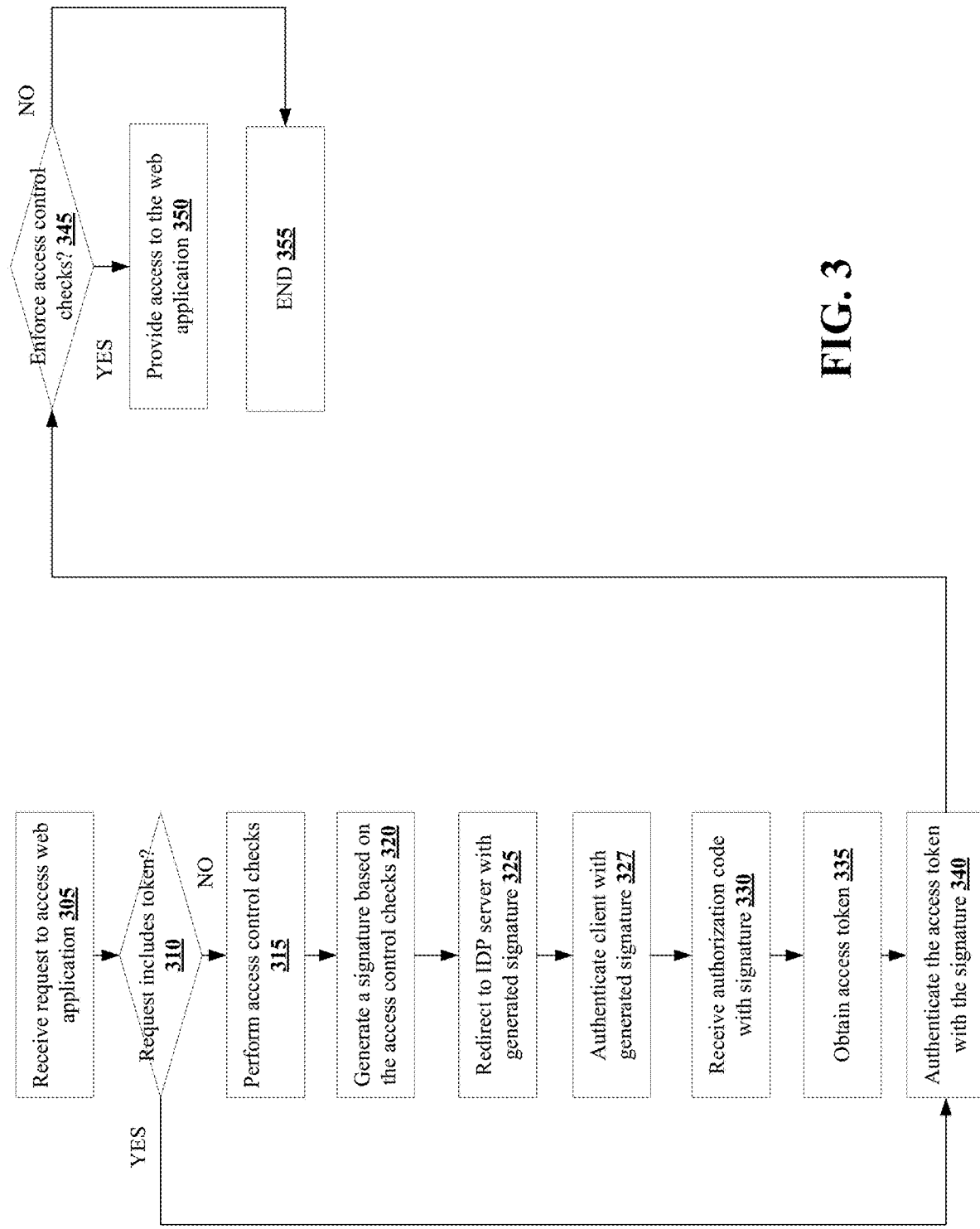
FIG. 3 is an exemplary flowchart of a method for managing a federated identity environment using security and access control data.

The memory 20 within the network traffic manager apparatus 14 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. The memory 20 may store one or more non-transitory computer-readable instructions of this technology as illustrated and described with reference to the examples herein that may be executed by the processor 18. The exemplary flowchart shown in FIG. 3 is representative of example steps or actions of this technology that may be embodied or expressed as one or more non-transitory computer or machine readable instructions stored in the memory 20 that may be executed by the processor 18 and/or may be implemented by configured logic in the optional configurable logic 21.

Figure 4:
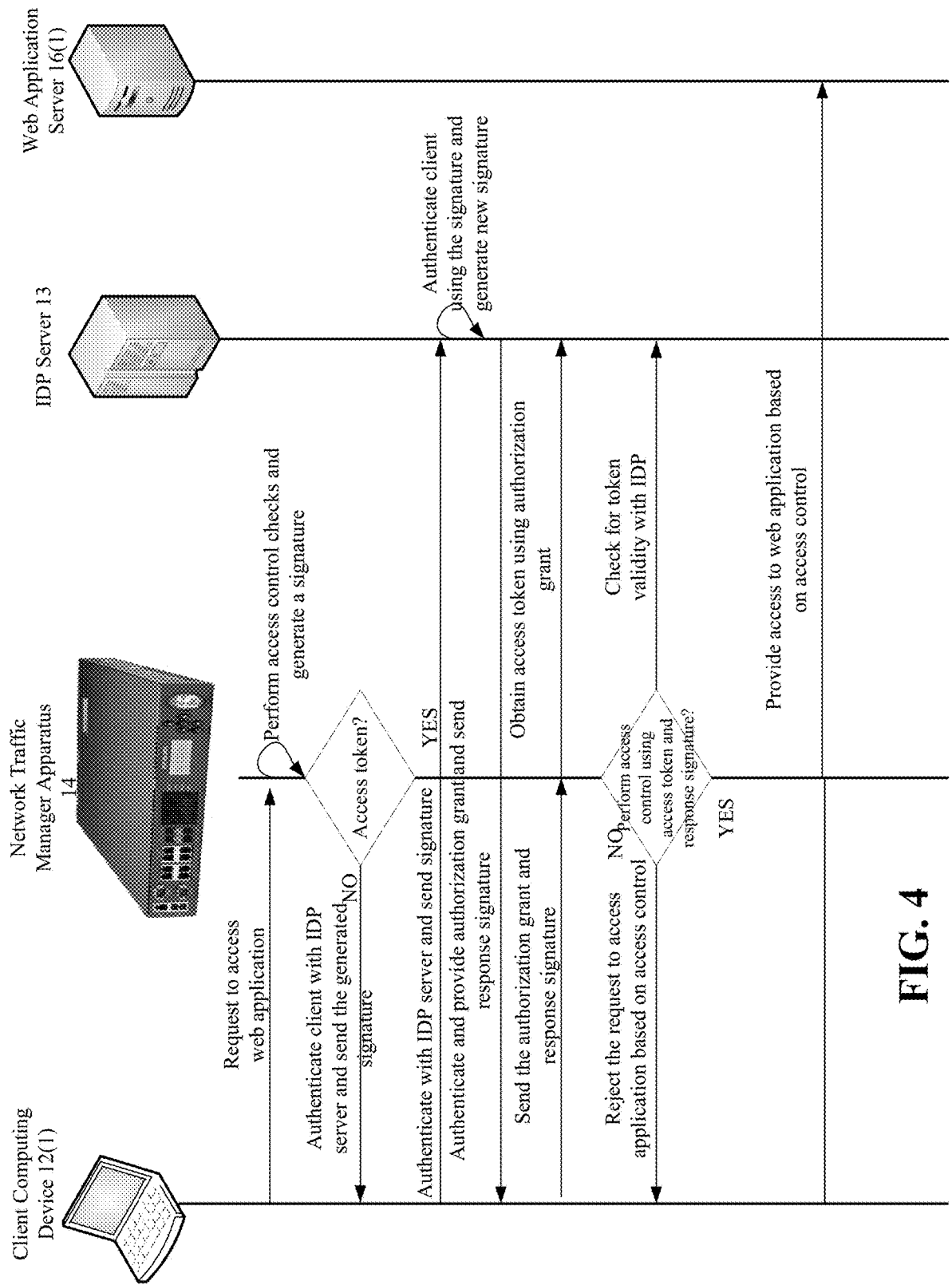
FIG. 4 is an exemplary sequence diagram for managing a federated identity environment using security and access control data.

Accordingly, the memory 20 of the network traffic manager apparatus 14 can store one or more applications that can include computer executable instructions that, when executed by the network traffic manager apparatus 14, causes the network traffic manager apparatus 14 to perform actions, such as to transmit, receive, or otherwise process messages, for example, and to perform other actions described and illustrated below with reference to FIGS. 3-4. The application(s) can be implemented as module or components of another application. Further, the application(s) can be implemented as operating system extensions, module, plugins, or the like. The application(s) can be implemented as module or components of another application. Further, the application(s) can be implemented as operating system extensions, module, plugins, or the like. Even further, the application(s) may be operative in a cloud-based computing environment. The application(s) can be executed within virtual machine(s) or virtual server(s) that may be managed in a cloud-based computing environment. Also, the application(s), including the network traffic manager apparatus 14 itself, may be located in virtual server(s) running in a cloud-based computing environment rather than being tied to one or more specific physical network computing devices. Also, the application(s) may be running in one or more virtual machines (VMs) executing on the network traffic manager apparatus 14. Additionally, in at least one of the various embodiments, virtual machine(s) running on the network traffic manager apparatus 14 may be managed or supervised by a hypervisor.

The optional configurable hardware logic device 21 in the network traffic manager apparatus 14 may comprise specialized hardware configured to implement one or more steps of this technology as illustrated and described with reference to the examples herein. By way of example only, the optional configurable logic hardware device 21 may comprise one or more of field programmable gate arrays ("FPGAs"), field programmable logic devices ("FPLDs"), application specific integrated circuits (ASICs") and/or programmable logic units ("PLUs").

The communication system 24 in the network traffic manager apparatus 14 is used to operatively couple and communicate between the network traffic manager apparatus 14, the plurality of client computing devices 12(1)-12(n), the IDP server 13, and the plurality of web application servers 16(1)-16(n) which are all coupled together by communication network 30 such as one or more local area networks (LAN) and/or the wide area network (WAN), although other types and numbers of communication networks or systems with other types and numbers of connections and configurations to other devices and elements may be used. By way of example only, the communication network such as local area networks (LAN) and the wide area network (WAN) can use TCP/IP over Ethernet and industry-standard protocols, including NFS, CIFS, SOAP, XML, LDAP, and SNMP, although other types and numbers of communication networks, can be used. In this example, the bus 26 is a PCI Express bus in this example, although other bus types and links may be used.

Each of the plurality of client computing devices 12(1)-12(n) of the network traffic management system 10, include a central processing unit (CPU) or processor, a memory, input/display device interface, configurable logic device and an input/output system or I/O system, which are coupled together by a bus or other link. The plurality of client computing devices 12(1)-12(n), in this example, may run interface applications, such as Web browsers, that may provide an interface to make requests for and send and/or receive data to and/or from the web application servers 16(1)-16(n) via the network traffic manager apparatus 14. Additionally, the plurality of client computing devices 12(1)-12(n) can include any type of computing device that can receive, render, and facilitate user interaction, such as client computers, network computer, mobile computers, mobile phones, virtual machines (including cloud-based computer), or the like. Each of the plurality of client computing devices 12(1)-12(n) utilizes the network traffic manager apparatus 14 to conduct one or more operations with the web application servers 16(1)-16(n), such as to obtain data and/or access the applications from one of the web application servers 16(1)-16(n), by way of example only, although other numbers and/or types of systems could be utilizing these resources and other types and numbers of functions utilizing other types of protocols could be performed.

The IDP server 13 of the network traffic management system include a central processing unit (CPU) or processor, a memory, and a communication system, which are coupled together by a bus or other link, although other numbers and/or types of network devices could be used. Generally, the IDP server 13 assists with generating and providing access tokens, via the communication network 30 according to the HTTP-based application RFC protocol or the CIFS or NFS protocol in this example, but the principles discussed herein are not limited to this example and can include other application protocols. A series of applications may run on the IDP server 13 that allows the transmission of data requested by the network traffic manager apparatus 14. It is to be understood that the IDP server 13 may be hardware or software or may represent a system with multiple external resource servers, which may include internal or external networks. In this example the IDP server 13 may be any version of Microsoft® IIS servers or Apache® servers, although other types of servers may be used.

Each of the plurality of web application servers 16(1)-16(n) of the network traffic management system include a central processing unit (CPU) or processor, a memory, and a communication system, which are coupled together by a bus or other link, although other numbers and/or types of network devices could be used. Generally, the plurality of web application servers 16(1)-16(n) process requests for providing access to one or more enterprise web applications received from the plurality of client computing devices 12(1)-12(n), network traffic manager apparatus 14, via the communication network 30 according to the HTTP-based application RFC protocol or the CIFS or NFS protocol in this example, but the principles discussed herein are not limited to this example and can include other application protocols. A series of applications may run on the plurality web application servers 16(1)-16(n) that allows the transmission of applications requested by the plurality of client computing devices 12(1)-12(n), or the network traffic manager apparatus 14. The plurality of web application servers 16(1)-16(n) may provide data or receive data in response to requests directed toward the respective applications on the plurality web application servers 16(1)-16(n) from the plurality of client computing devices 12(1)-12(n) or the network traffic manager apparatus 14. It is to be understood that the plurality of web application servers 16(1)-16(n) may be hardware or software or may represent a system with multiple external resource servers, which may include internal or external networks. In this example the plurality of web application servers 16(1)-16(n) may be any version of Microsoft® IIS servers or Apache® servers, although other types of servers may be used.

Although the plurality of web application servers 16(1)-16(n) are illustrated as single servers, one or more actions of the IDP server 13 and each of the plurality of web application servers 16(1)-16(n) may be distributed across one or more distinct network computing devices. Moreover, the plurality of web application servers 16(1)-16(n) are not limited to a particular configuration. Thus, the plurality of plurality web application servers 16(1)-16(n) may contain a plurality of network computing devices that operate using a master/slave approach, whereby one of the network computing devices of the plurality of web application servers 16(1)-16(n) operate to manage and/or otherwise coordinate operations of the other network computing devices. The plurality of web application servers 16(1)-16(n) may operate as a plurality of network computing devices within cluster architecture, a peer-to peer architecture, virtual machines, or within a cloud architecture.

Thus, the technology disclosed herein is not to be construed as being limited to a single environment and other configurations and architectures are also envisaged. For example, the one or more of the plurality of web application servers 16(1)-16(n) depicted in FIG. 1 can operate within network traffic manager apparatus 14 rather than as a standalone server communicating with network traffic manager apparatus 14 via the communication network(s) 30. In this example the plurality of web application servers 16(1)-16(n) operate within the memory 20 of the network traffic manager apparatus 14.

While the network traffic manager apparatus 14 is illustrated in this example as including a single device, the network traffic manager apparatus 14 in other examples can include a plurality of devices or blades each with one or more processors each processor with one or more processing cores that implement one or more steps of this technology. In these examples, one or more of the devices can have a dedicated communication interface or memory. Alternatively, one or more of the devices can utilize the memory, communication interface, or other hardware or software components of one or more other communicably coupled of the devices. Additionally, one or more of the devices that together comprise network traffic manager apparatus 14 in other examples can be standalone devices or integrated with one or more other devices or applications, such as one of the IDP server 13, plurality of web application servers 16(1)-16(n) or, the network traffic manager apparatus 14, or applications coupled to the communication network(s), for example. Moreover, one or more of the devices of the network traffic manager apparatus 14 in these examples can be in a same or a different communication network 30 including one or more public, private, or cloud networks, for example.

Although an exemplary network traffic management system 10 with the plurality of client computing devices 12(1)-12(n), the IDP server 13, the network traffic manager apparatus 14, and the plurality of web application servers 16(1)-16(n), communication networks 30 are described and illustrated herein, other types and numbers of systems, devices, blades, components, and elements in other topologies can be used. It is to be understood that the systems of the examples described herein are for exemplary purposes, as many variations of the specific hardware and software used to implement the examples are possible, as will be appreciated by those skilled in the relevant art(s).

Further, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

One or more of the components depicted in the network traffic management system, such as the network traffic manager apparatus 14, the plurality of client computing devices 12(1)-12(n), the IDP server 13, the plurality of web application servers 16(1)-16(n), for example, may be configured to operate as virtual instances on the same physical machine. In other words, one or more of network traffic manager apparatus 14, the IDP server 13, the plurality of client computing devices 12(1)-12(n), or the plurality of web application servers 16(1)-16(n) illustrated in FIG. 1 may operate on the same physical device rather than as separate devices communicating through a network as depicted in FIG. 1. There may be more or fewer plurality of client computing devices 12(1)-12(n), the IDP server 13, network traffic manager apparatus 14, or the plurality of web application servers 16(1)-16(n) than depicted in FIG. 1. The plurality of client computing devices 12(1)-12(n), the IDP server 13, the plurality of web application servers 16(1)-16(n) could be implemented as applications on network traffic manager apparatus 14.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An example of a method for managing a federated identity environment using security and access control data will now be described with reference to FIGS. 1-4. Particularly with reference to FIGS. 3 and 4, in step 305, the network traffic manager apparatus 14 receives a request from one of the plurality of client computing devices 12(1)-12(n) to access a web application in the plurality of web applications 16(1)-16(n), although the network traffic manager apparatus 14 can receive other types of requests from other devices.

Next in step 310, the network traffic manager apparatus 14 determines when the received request includes an access token. Accordingly, when the network traffic manager apparatus 14 determines that the received request includes the access token, then the Yes branch is taken to step 340 which will further be illustrated below. However, when the network traffic manager apparatus 14 determines that the received request does not include the received token, then the No branch is taken to step 315.

In step 315, the network traffic manager apparatus 14 performs access control checks on the requesting one of the plurality of client computing devices 12(10-12(n). In this example, performing access control checks relates to determining if the requesting one of the plurality of client computing devices 12(1)-12(n) has required authentication, hardware and/or software resources illustrated in the access control and the security policy, although access control checks and include other types and/or amounts of functions. By way of example, different types of access control checks can include determining for the presence of anti-virus, firewall, a specific version of the operation system, user role, user group, although the access control checks can include other types of checks.

Next in step 320, the network traffic manager apparatus 14 generates a signature to include data associated with the type of access control checks that were performed and the results of the access control checks, although the signature can include other types and/or amounts of data such that the IDP server 13 receiving the signature can verify the authenticity of the signature before using it. By generating a signature and including the data relating to completed access control checks, knowledge of the completed access control checks is passed to other entities so that they can have complete understanding of the user and their device. Additionally, by knowing what checks the user has already gone through, entities can speed up their checks by not repeating the checks the user has already completed. In another example, based on the data in the signature, additional access control checks can be performed, or the number of access control checks can also be reduced.

Next in step 325, the network traffic manager apparatus 14 redirects the requesting one of the plurality of client computing devices 12(1)-12(n) to the IDP server 13 along with the generated signature. In this example, the requesting one of the plurality of client computing devices 12(1)-12(n) provides the IDP server 13 with the necessary credentials to access the web application; although the network traffic manager apparatus 14 can provide the credentials to the IDP server 13 while redirecting.

Next in step 327, the IDP server 13 then determines the validity of the credentials and when the credentials are determined to be valid, performs one or more additional access control and/or security checks. In this example, the IDP server 13 obtains the data such as user and the device information from the signature to identify the types and/or number of access control checks that were previously completed and can use this data to change (add, reduce, or perform selective access control) the access control check that is going to be performed, although the IDP server 13 can use other types or amounts of parameters to take this decision. Next, the IDP server 13 provides the requesting one of the plurality of client computing devices 12(1)-12(n) with the authorization grant code. Additionally in this example, prior to redirecting the requesting one of the plurality of client computing devices 12(1)-12(n) back to the network traffic manager apparatus 14, the IDP server can generate a new signature to include data associated with the security and access control checks performed by the IDP server 13, although the new signature can include other types or amounts of information. Finally, the IDP server 13 redirects the requesting one of the plurality of client computing devices 12(1)-12(n) back to the network traffic manager apparatus 14 along with the new signature. Alternatively in another example, the IDP server 13 can redirect the requesting one of the plurality of client computing devices 12(1)-12(n) to a second IDP server (not illustrated) to perform additional access control checks and can generate and include a new signature (data associated with the access control checks performed by the IDP server) while redirecting. Further, the second IDP server can perform additional access control checks based on the signature received from the IDP server 13 and create an additional signature to include this additional signature while redirecting the requesting one of the plurality of client computing devices 12(1)-12(n) either back to the IDP server 13 or the network traffic manager apparatus 14. In this example, the generated signature(s) include the data associated with the access control checks performed by each of the devices such as the network traffic manager apparatus 14, the IDP server 13, and/or the second IDP server (not shown), although the generated signature can include other types and/or amounts of information such that the receiving device can verify the authenticity of the signature before using it.

While this example illustrates the IDP server 13 performing the step of authentication, in other examples the network traffic manager apparatus 14 can perform the step of authentication and generating the authorization grant code. Alternatively, the network traffic manager apparatus 14 can obtain the required data from the requesting one of the plurality of client computing devices 12(1)-12(n) to authenticate the obtained data from the requesting one of the plurality of client computing devices 12(1)-12(n) with the IDP server 13 directly instead of redirecting the request to the IDP server 13.

In step 330, the network traffic manager apparatus 14 receives the authorization grant code from the requesting one of the plurality of client computing devices 12(1)-12(n), although the network traffic manager apparatus 14 can receive other types and/or amounts of data from the requesting client computing device confirming the authentication. Additionally in this example, the network traffic manager apparatus 14 receives a response signature (either the new signature or the additional signature) along with the authorized grant code when the requesting one of the plurality of client computing devices 12(1)-12(n) is redirected back to the network traffic manager apparatus. In this example, the response signature includes data associated with all the access control checks that were performed by different devices, although the response signature can include other types or amounts of information.

Next in step 335, the network traffic manager apparatus 14 obtains an access token from the IDP server 13 using the authorization grant code, although the network traffic manager apparatus 14 can obtain the access token using other types or amounts of information. Alternatively in another example, the network traffic manager apparatus 14 can generate the access token using the authorization grant code.

In step 340, the network traffic manager apparatus 14 authenticates the obtained or received (from the request in step 305) access token with the IDP server 13, although the network traffic manager apparatus 14 can authenticate the obtained access token using other techniques. In this example, the network traffic manager apparatus 14 authenticates the access token by determining if the requesting one of the plurality of client computing devices 12(1)-12(n) has the required rights to access the web application and also determines whether the time period of the access token has expired by checking with the IDP server 13, although the network traffic manager apparatus 14 can use other techniques to authenticate the access token.

Next in step 345, the network traffic manager apparatus 14 determines when to enforce the access control checks based on the received response signature, although the network traffic manager apparatus 14 can make the determination using other parameters. Additionally and by way of example, the network traffic manager apparatus 14 can also determine if the token has expired and/or whether the requesting one of the plurality of client computing devices 12(1)-12(n) has the access rights to use the application by enforcing additional access control checks based on the data in the received response signature, although the network traffic manager apparatus 14 can determine the validity using other techniques. Accordingly, when the network traffic manager apparatus 14 determines that the result of the access control check fails, then the No branch is taken to step 355 where the exemplary method ends. However, when the network traffic manager apparatus 14 determines that result of the access control check is successful, then the Yes branch is taken to step 350.

In step 350, the network traffic manager apparatus 14 provides access to the requesting one of the plurality of client computing devices 12(1)-12(n) based on the access token, although the network traffic manager apparatus 14 can provide the access using other types or amounts of data. The exemplary method ends in step 355.

Accordingly, as illustrated and described by way of the examples herein, this technology provides a number of advantages including providing methods, non-transitory computer readable media and devices for managing a federated identity environment using security and access control data. Using the above illustrated examples, the disclosed technology is able to provide the client devices with a faster response to the request to access the application. Additionally, the disclosed technology is able to optimize authentication by sharing access control and security related data between the network traffic manager apparatus and the IDP server(s).

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the technology is limited only by the following claims and equivalents thereto.

What is claimed is:

1. A method for managing a federated identity environment, the method implemented by a network traffic management system comprising one or more network traffic apparatuses, client devices, or server devices, the method comprising:
   performing an initial access control check on a client upon receiving a request to access a web application;
   generating a signature comprising data associated with the performed initial access control check including a type and a result of the performed initial access control check;
   sending the client to a first server with the generated signature to determine when to authorize the client to access the requested web application; and
   granting the client access to the requested web application when the client is determined to be authorized to access the requested web application, based on subsequent access control check enforced on the client using the generated signature comprising the data associated with the performed initial access control check, wherein data associated with the enforced subsequent access control check is included in a response signature and wherein the enforced subsequent access control check are different from the performed initial access control check.

2. The method as set forth in claim 1, further comprising:
   obtaining an access token associated with the requested web application;
   determining a result of enforcing the initial access control check or the subsequent access control check; and
   providing access to the requesting client to access the requested web application based on the determined result.

3. The method as set forth in claim 1, further comprising:
   receive a response signature from the client prior to the granting, wherein the response signature comprises the subsequent access control check performed by a first server or a second server;
   modify the initial access control check or the subsequent access control check based on the received response signature; and
   enforce the modified initial access control check or the subsequent access control check on the client.

4. The method as set forth in claim 1, further comprising, redirecting the client to a second server from the first server with a new signature, wherein the new signature is generated based on additional access control check performed at the first server.

5. A non-transitory computer readable medium having stored thereon instructions for managing a federated identity environment comprising executable code which when executed by one or more processors, causes the processors to:
   perform an initial access control check on a client upon receiving a request to access a web application;
   generate a signature comprising data associated with the performed initial access control check including a type and a result of the performed initial access control check;
   send the client to a first server with the generated signature to determine when to authorize the client to access the requested web application; and
   grant the client access to the requested web application when the client is determined to be authorized to access the requested web application, based on subsequent access control check enforced on the client using the generated signature comprising the data associated with the performed initial access control check, wherein data associated with the enforced subsequent access control check is included in a response signature and wherein the enforced subsequent access control check are different from the performed initial access control check.

6. The medium as set forth in claim 5, further comprising:
   obtaining an access token associated with the requested web application;
   determining a result of enforcing the initial access control check or the subsequent access control check; and
   providing access to the requesting client to access the requested web application based on the determined result.

7. The medium as set forth in claim 5, further comprising:
   receive a response signature from the client prior to the granting, wherein the response signature comprises the subsequent access control check performed by a first server or a second server;
   modify the initial access control check or the subsequent access control check based on the received response signature; and
   enforce the modified initial access control check or the subsequent access control check on the client.

8. The medium as set forth in claim 5, further comprising, redirect the client to a second server from the first server with a new signature, wherein the new signature is generated based on additional access control check performed at the first server.

9. A network traffic manager apparatus, comprising memory comprising programmed instructions stored in the memory and one or more processors configured to be capable of executing the programmed instructions stored in the memory to:
   perform an initial access control check on a client upon receiving a request to access a web application;
   generate a signature comprising data associated with the performed initial access control check including a type and a result of the performed initial access control check;
   send the client to a first server with the generated signature to determine when to authorize the client to access the requested web application; and
   grant the client access to the requested web application when the client is determined to be authorized to access the requested web application, based on subsequent access control check enforced on the client using the generated signature comprising the data associated with the performed initial access control check, wherein data associated with the enforced subsequent access control check is included in a response signature and wherein the enforced subsequent access control check are different from the performed initial access control check.

10. The network traffic manager apparatus as set forth in claim 9, wherein the one or more processors are further configured to be capable of executing the programmed instructions stored in the memory to:
    obtain an access token associated with the requested web application;
    determine a result of enforcing the initial access control check or the subsequent access control check; and
    provide access to the requesting client to access the requested web application based on the determined result.

11. The network traffic manager apparatus as set forth in claim 9, wherein the one or more processors are further configured to be capable of executing the programmed instructions stored in the memory to:

receive a response signature from the client prior to the granting, wherein the response signature comprises the subsequent access control check performed by a first server or a second server;

modify the initial access control check or the subsequent access control check based on the received response signature; and enforce the modified initial access control check or the subsequent access control check on the client.

12. The network traffic manager apparatus as set forth in claim 9, wherein the one or more processors are further configured to be capable of executing the programmed instructions stored in the memory to redirect the client to a second server from the first server with a new signature, wherein the new signature is generated based on additional access control check performed at the first server.

13. A network traffic management system, comprising one or more traffic management apparatuses, client devices, or server devices, the network traffic management system comprising memory comprising programmed instructions stored thereon and one or more processors configured to be capable of executing the stored programmed instructions to:

perform an initial access control check on a client upon receiving a request to access a web application;

generate a signature comprising data associated with the performed initial access control check including a type and a result of the performed initial access control check;

send the client to a first server with the generated signature to determine when to authorize the client to access the requested web application; and grant the client access to the requested web application when the client is determined to be authorized to access the requested web application, based on subsequent access control check enforced on the client using the generated signature comprising the data associated with the performed initial access control check, wherein data associated with the enforced subsequent access control check is included in a response signature and wherein the enforced subsequent access control check are different from the performed initial access control check.

14. The network traffic manager apparatus as set forth in claim 13, wherein the one or more processors are further configured to be capable of executing the programmed instructions stored in the memory to:

obtain an access token associated with the requested web application;

determine a result of enforcing the initial access control check or the subsequent access control check; and provide access to the requesting client to access the requested web application based on the determined result.

15. The network traffic manager apparatus as set forth in claim 13, wherein the one or more processors are further configured to be capable of executing the programmed instructions stored in the memory to:

receive a response signature from the client prior to the granting, wherein the response signature comprises the subsequent access control check performed by a first server or a second server;

modify the initial access control check or the subsequent access control check based on the received response signature; and enforce the modified initial access control check or the subsequent access control check on the client.

16. The network traffic management system of claim 13, wherein the one or more processors are further configured to be capable of executing the programmed instructions stored in the memory to redirect the client to a second server from the first server with a new signature, wherein the new signature is generated based on additional access control check performed at the first server.

* * * * *